United States Patent
Matsumoto et al.

(10) Patent No.: US 6,813,394 B1
(45) Date of Patent: Nov. 2, 2004

(54) IMAGE STORAGE METHOD AND APPARATUS

(75) Inventors: Kentaro Matsumoto, Higashikurume (JP); Miyuki Enokida, Yokohama (JP); Kunihiro Yamamoto, Yokohama (JP); Kiyoshi Kusama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,965

(22) Filed: Aug. 30, 1999

(30) Foreign Application Priority Data

| Aug. 31, 1998 | (JP) | 10-245101 |
| Aug. 31, 1998 | (JP) | 10-245102 |
| Aug. 31, 1998 | (JP) | 10-245103 |
| Aug. 31, 1998 | (JP) | 10-245104 |
| Aug. 31, 1998 | (JP) | 10-245105 |

(51) Int. Cl.$^7$ .............. G06K 9/54; G09G 5/00; G06F 7/00
(52) U.S. Cl. .............. 382/305; 345/612; 707/100
(58) Field of Search .............. 382/305, 162, 382/173, 190, 192, 195, 232, 233; 707/1, 5, 7, 100, 200–205, 530; 345/593, 581, 612, 686; 358/1.9

(56) References Cited

U.S. PATENT DOCUMENTS

| 4,653,021 A | * | 3/1987 | Takagi | 707/5 |
| 5,038,298 A | | 8/1991 | Matsumoto et al. | 364/518 |
| 5,060,280 A | | 10/1991 | Mita et al. | 382/33 |
| 5,157,773 A | | 10/1992 | Matsumoto et al. | 395/375 |
| 5,444,550 A | | 8/1995 | Enokida et al. | 358/453 |
| 5,561,531 A | * | 10/1996 | Funazaki | 386/95 |
| 5,724,579 A | | 3/1998 | Suzuki | 395/615 |
| 5,860,075 A | * | 1/1999 | Hashizume et al. | 707/530 |
| 5,893,095 A | * | 4/1999 | Jain et al. | 707/6 |
| 5,977,946 A | * | 11/1999 | Mizobata | 345/112 |
| 6,400,890 B1 | * | 6/2002 | Nagasaka et al. | 386/69 |
| 6,476,821 B2 | * | 11/2002 | Sawada et al. | 345/620 |

FOREIGN PATENT DOCUMENTS

EP 0 327 931 A2 8/1989 ............ H04N/1/41

OTHER PUBLICATIONS

Liaw, W. M., *Reading GIF Files,* Dobb's Journal, vol. 2, No. 2, pp. 56, 58, 60, 103, and 106–107 (1995).
Graef, G. L., *Graphics Formats,* Byte, vol. 14, No. 9, pp. 305–306 and 308–310 (1989).
Luque Ruiz et al., *Gesim: Image Management System for Tiff Structures,* Computers and Graphics, vol. 16, No. 3, pp. 325–329 (1992).
Wiederhold, G., *Compression and Indexing of Images for Databases,* URL: http://www.db.stanford.edu/pub/gio/cs/545/5451-97/cs545index.ppt.
Gong et al., *Image Indexing and Retrieval Based on Color Histograms,* Multimedia Tools and Applications, vol. 2, No. 2, pp. 133–156 (1996).

* cited by examiner

*Primary Examiner*—Kanji Patel
(74) *Attorney, Agent, or Firm*—Fitzpatrick, Cella, Harper & Scinto

(57) ABSTRACT

A plurality of images and a feature of each of these images are stored in one image file. An attribute information area stores attribute information necessary to read out and display the images stored in the image file. A feature data area continuously stores features of the images stored in the image file. An image data area continuously stores image data of the images stored in the image file. Since one image file has the attribute information, the feature data area continuously storing the features of all images, and the image data area continuously storing all images, high-speed access to the image data and simple management of the image data are realized.

24 Claims, 41 Drawing Sheets

FIG. 4

| | | | |
|---|---|---|---|
| R (0, 0) | G (0, 0) | B (0, 0) | NA |
| R (1, 0) | G (1, 0) | B (1, 0) | NA |
| R (2, 0) | G (2, 0) | B (2, 0) | NA |
| R (0, 1) | G (0, 1) | B (0, 1) | NA |
| R (1, 1) | G (1, 1) | B (1, 1) | NA |
| R (2, 1) | G (2, 1) | B (2, 1) | NA |

401 FEATURE DATA FOR FIRST IMAGE

| | | | |
|---|---|---|---|
| R (0, 0) | G (0, 0) | B (0, 0) | NA |
| | | | |

402 FEATURE DATA FOR SECOND IMAGE

| | | | |
|---|---|---|---|
| R (0, 0) | G (0, 0) | B (0, 0) | NA |
| R (1, 0) | G (1, 0) | B (1, 0) | NA |
| R (2, 0) | G (2, 0) | B (2, 0) | NA |
| R (0, 1) | G (0, 1) | B (0, 1) | NA |
| R (1, 1) | G (1, 1) | B (1, 1) | NA |
| R (2, 1) | G (2, 1) | B (2, 1) | NA |

FEATURE DATA FOR NTH IMAGE

IMAGE STORAGE METHOD AND APPARATUS

BACKGROUND OF THE INVENTION

1. Field of the Invention

The present invention relates to an image storage method and apparatus for an image database used to search for a desired image from a plurality of images.

2. Description of the Related Art

A number of image databases for searching for desired images from a large amount of image data have been proposed. Many of these image databases are roughly classified into:

*a method which relates non-image information such as a keyword or photographing date to each image and searches for an image on the basis of this information; and
*a method which searches for an image on the basis of features (e.g., luminance•color difference information, image frequency, and histogram) of each image.

In both methods, information for search and image data are generally separately managed. For example, data for search is managed by one file or relational database and used as an object of search. The file name of image data corresponding to a search result is obtained, and on the basis of this file name the image data is accessed and displayed. This method is employed because image data generally has a large volume and hence can be managed more efficiently when managed separately from search data.

Individual image data is managed in a file system, and the following two methods are possible as the method of management. The first method is to manage all image data as one directory. The second method is to segment image data into several groups in units of a plurality of images and manage these groups by classifying them into directories. For example, image data are classified into directories in accordance with the contents of images such as "animal" and "flower".

In either of the above first and second methods, however, when a plurality of images obtained from the result of search using a search key or the like are to be simultaneously displayed, image access requires an extremely long time if the number of images is very large.

The first method can easily manage images. However, if the number of images is extremely large, a huge time is necessary to obtain only directory information. In the second method, it is necessary to always accurately maintain the correspondence between image files and directories, and this complicates management such as movement of image files.

Also, registration of images into an image database is usually automated. For example, images are successively read from a continuous film by a scanner apparatus and registered in a database. Alternatively, motion images are continuously input as still images from a video tape or the like and registered in a database. These methods have been put into practical use.

In taking photographs, however, the same scene is often photographed continuously. In the case of videotaping, the same image continues for several seconds in many instances. In either case, a number of images of exactly the same scene, or very similar scenes, are successively registered in a database if the automatic registration as described above is performed. Furthermore, images which the user does not require, e.g., commercial images, are sometimes registered between necessary images.

It is desirable to eliminate these images from a database. However, as described previously, general image databases require a long time to access images and a complicated way to manage directories and the like. Therefore, even deleting a single image requires a long time.

SUMMARY OF THE INVENTION

The present invention has been made in consideration of the above situation, and has as its object to allow high-speed access to image data and simple management of image data.

It is another object of the present invention to allow high-speed access to image data and simple management of image data, and delete image data from an image database at high speed.

It is still another object of the present invention to reliably erase the body of image data as a delete target and thereby reduce the data size of an image database.

It is still another object of the present invention to allow the restoration of even a once deleted image when it is again required.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing details of the data format of an image feature data area 202 in FIG. 2;

DETAILED DESCRIPTION OF THE PREFERRED EMBODIMENTS

Preferred embodiments of the present invention will now be described in detail in accordance with the accompanying drawings.

<First Embodiment>

Figure 1:
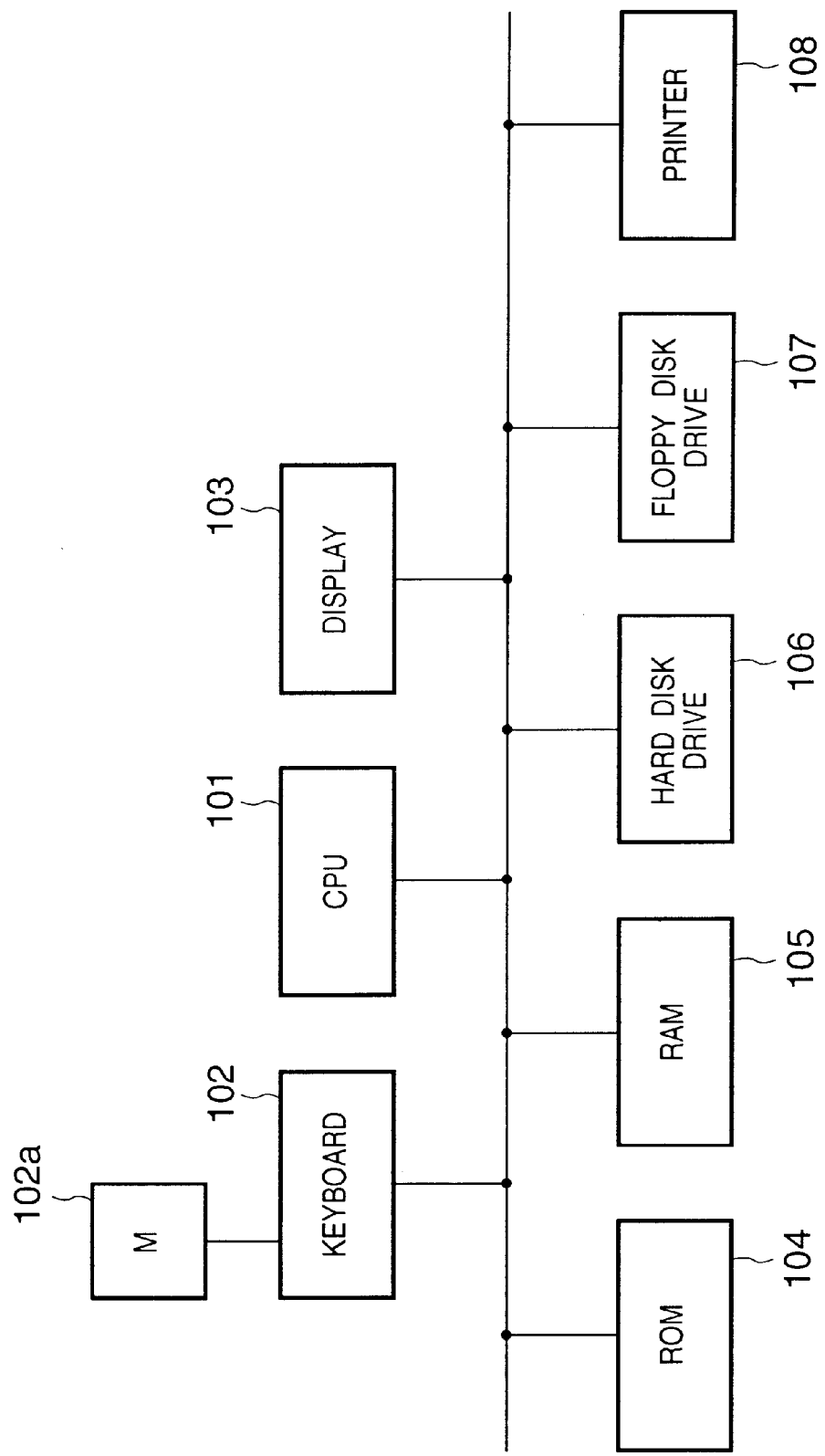
FIG. 1 is a block diagram showing the arrangement of a computer system as an image storage apparatus according to the first embodiment.

FIG. 1 is a block diagram showing the arrangement of a computer system as an image storage apparatus according to the first embodiment. Referring to FIG. 1, a CPU 101 controls the whole system. A keyboard 102 is used together with a mouse 102a to operate the system. A display 103 is constructed of a CRT or a liquid crystal display. A ROM 104 and a RAM 105 construct a storage device of the system and store programs to be executed by the system and data to be used by the system. A hard disk drive 106 and a floppy disk drive 107 construct an external storage to be used by a file system of the system. A printer 108 forms a visual image on a printing medium on the basis of image data.

Note that processes such as image file formation to be explained later are performed by the CPU 101 by executing the control programs stored in the ROM 104 or the RAM 105. Note also that an image file formed in the following explanation is finally stored in the external storage device such as the hard disk or the floppy disk.

Figure 2:
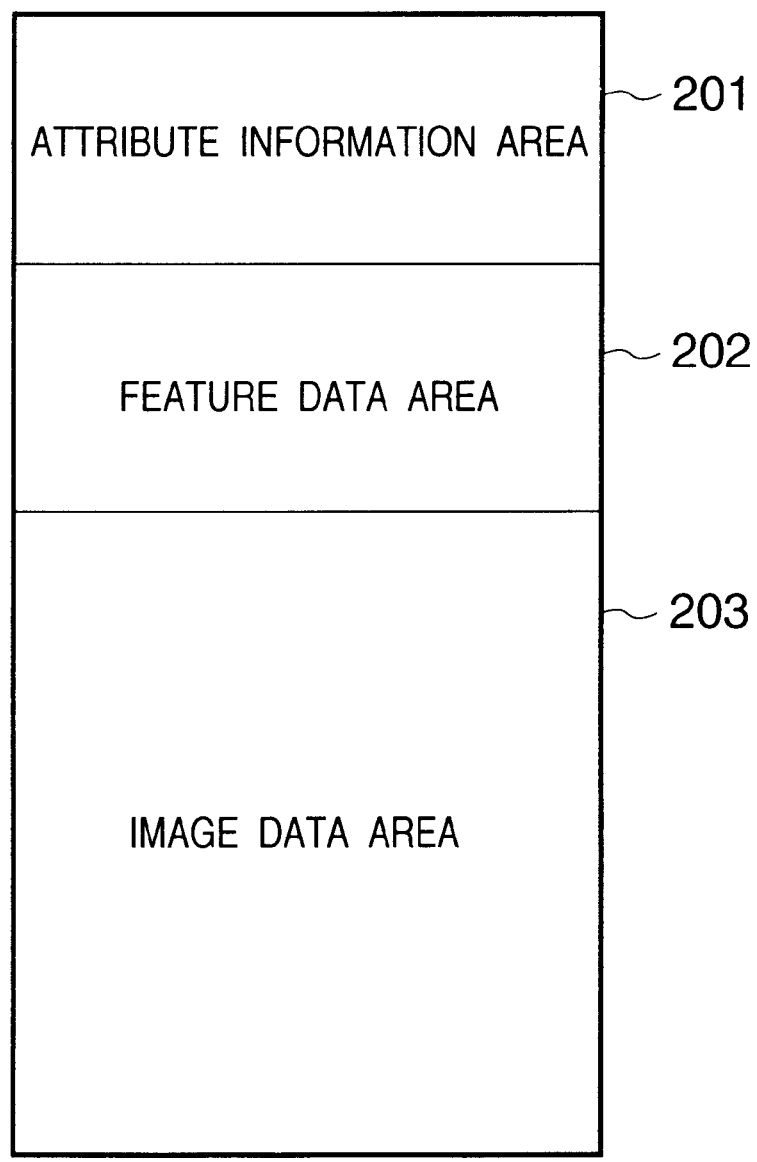
FIG. 2 is a view showing an outline of the data format of an image file formed by an image storage method according to the first embodiment.

FIG. 2 is a view showing an outline of the data format of an image file formed by an image storage method according to this embodiment. An attribute information area 201 stores pieces of information, such as the number of images, a compression method, the numbers of vertical and horizontal pixels, and a feature extraction method, necessary read out and display an image. A feature data area 202 continuously records features (e.g., luminance•color difference information, image frequency, and histogram) of a plurality of images. An image data area 203 continuously records image data of all of these images. In this embodiment, this image data stored in the image data area 203 is also called a tile image in some cases.

Figure 3:
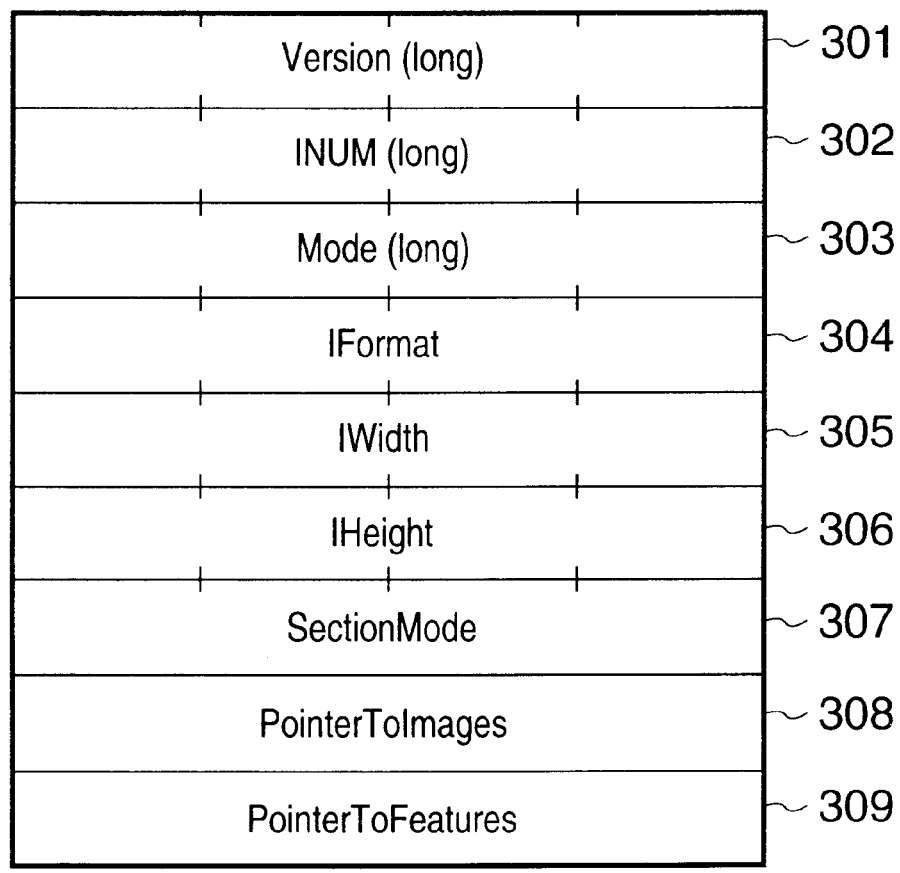
FIG. 3 is a view showing details of the data format of an attribute information area 201 in FIG. 2.

FIG. 3 is a view showing details of the data format of the attribute information area 201 in FIG. 2. In this embodiment, each area is composed of four bytes. However, the size of each area can also be changed in accordance with the number or size of images to be processed. An area 301 stores version information (Version) indicating the revision number of this image format. An area 302 stores the number of images (INUM) indicating the total number of images contained in this file. An area 303 stores a color space mode (Mode) indicative of a value used as an image feature. For example, a value 0 is set in the area 303 when an RGB value is used as color difference information, and a value 1 is set when YUV is used. A color space mode is identified by this value. An area 304 stores information (IFormat) indicative of the format of an image stored in the image data area 203. For example, a value 0 is set for image data compressed by JPEG, a value 1 is set for bitmap data (BMP), and a value 2 is set for a FlashPix format.

Areas 305 and 306 store pieces of information (IWidth and IHeight) representing, by the number of pixels, the width and height, respectively, of each image stored in the image data area 203. In the image data area 203 in an image file of this embodiment, image data of the width and height designated in the areas 305 and 306 are stored. An area 307 stores information (SectionMode) indicating a method of segmenting a frame when a feature is calculated. This embodiment employs two segmentation modes, e.g., a segment-by-six mode and a non-segmentation mode, as will be described later. A value 0 is set when the segment-by-six mode is used, and a value −1 is set when the non-segmentation mode is used. An area 308 stores a pointer (PointerToImages) indicating the start address of the image data area 203. An area 309 stores a pointer (PonterToFeatures) indicative of the start address of the image feature data area 202. For example, if the image feature data area 202 continues with no space immediately after the attribute information area 201, the value of the pointer in the image feature data area 209 is 36 because the attribute information area has 36 bytes in the example shown in FIG. 3.

The order of the pieces of information in the areas 301 to 309 is not restricted to the aforementioned order of this embodiment.

FIG. 4 is a view showing details of the data format of the image feature data area 202 in FIG. 2. In FIG. 4, reference numerals 401 and 402 denote features calculated from the first and second images, respectively, of a plurality of images. A method of this image feature calculation will be described later. In this embodiment, one image is segmented into six blocks, and the feature of each block is calculated. Accordingly, in FIG. 4, a total of 18 data from R(0,0) to B(2,1) represent the feature of one image. This number of feature data is the same for all images contained in this image file. R(0,0), G(0,0), and B(0,0) indicate the average values of RGB values in the first area (e.g., the upper left corner) of six segmented blocks of one image. In FIG. 4, reference symbol NA indicates that the value has no meaning. This is so because in this embodiment the average value of each of R, G, and B is indicated by 1 byte and data is processed in units of 4 bytes for the sake of simplicity. Another possible method is to delete this NA portion and shift the feature data close together. However, this method slightly complicates address control in image search.

Figure 5:
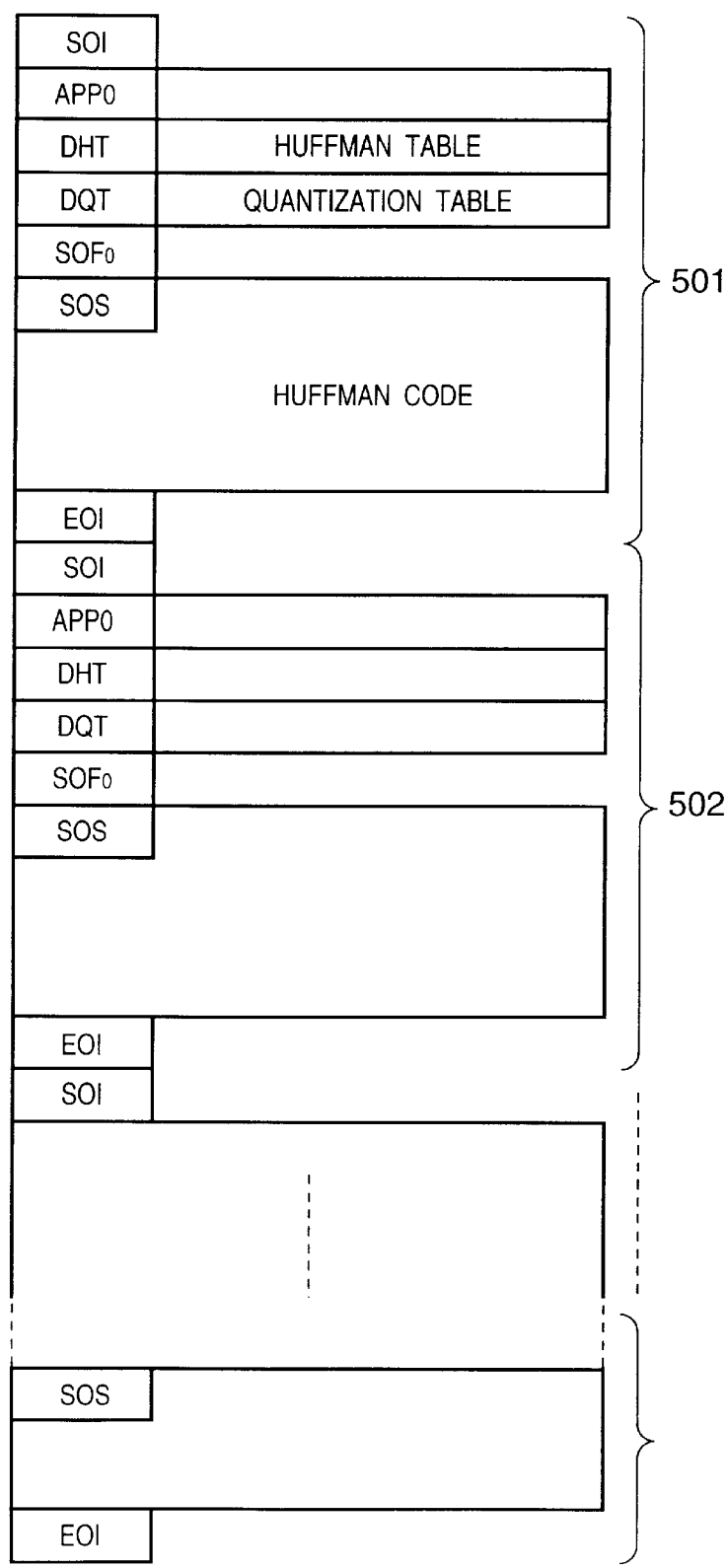
FIG. 5 is a view showing details of an image data area 203 in FIG. 2.

FIG. 5 is a view showing details of the image data area 203 in FIG. 2. This example uses JPEG. In this embodiment, therefore, JPEG is indicated in the image format item 304 in the attribute information area.

In FIG. 5, reference numeral 501 denotes JPEG compressed data of the first image in the image data; 502, JPEG compressed data of the second image. Referring to FIG. 5, SOI, $APP_0$, DHT, DQT, $SOF_0$, SOS, and EOI are delimiters called markers. SOI indicates the start of JPEG data; EOI, the end of the data; $APP_0$, an area arbitrarily usable by an application; DHT, a Huffman table; DQT, a quantization table, $SOF_0$, baseline JPEG compression; and SOS, a Huffman code. A portion between SOI and EOI is compressed data of one image. Note that JPEG is described in ITU-T WHITE BOOK Digital Still Image Compression Coding Relevant Recommendations (issued by New ITU Association of Japan). Note also that JPEG data is used in the example shown in FIG. 5, but another image file format such as BMP or FlashPix can also be used.

Next, a process procedure of forming a file by writing data with the aforementioned format in the hard disk 106 or the floppy disk 107 will be described below. Assume that the version number indicating the revision number of this image format is 3, the number of images is 100, the feature mode is RGB, the image format is JPEG, the image size is width×height=384×256, and the feature extraction is segmentation mode.

Figure 6:
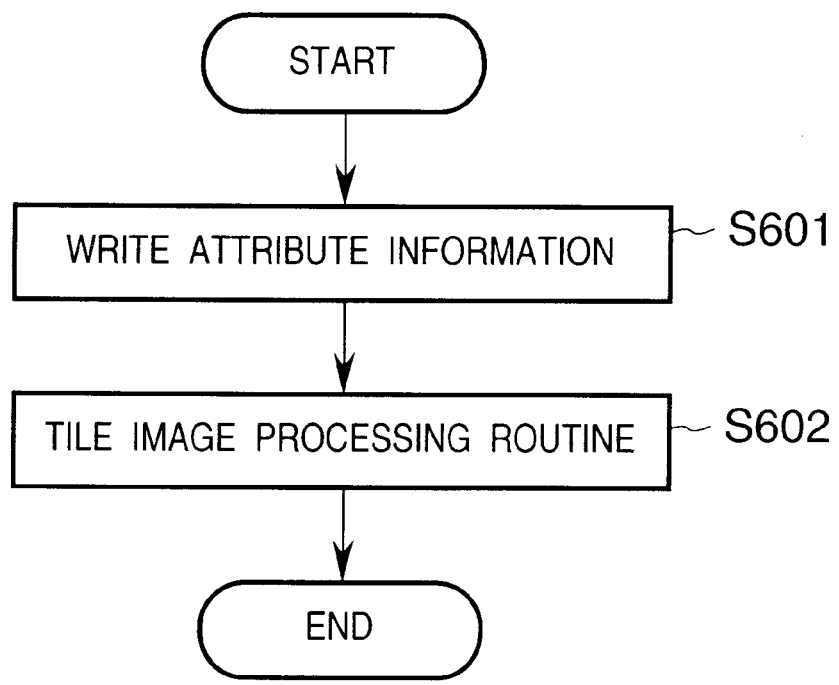
FIG. 6 is a flow chart for explaining an image data file formation procedure in the first embodiment.

FIG. 6 is a flow chart for explaining the image data file formation procedure in the first embodiment. In step S601, data are written in the attribute information area 201. In step S602, data are simultaneously written in the image data area 203 and the image feature data area 202.

Figure 7:
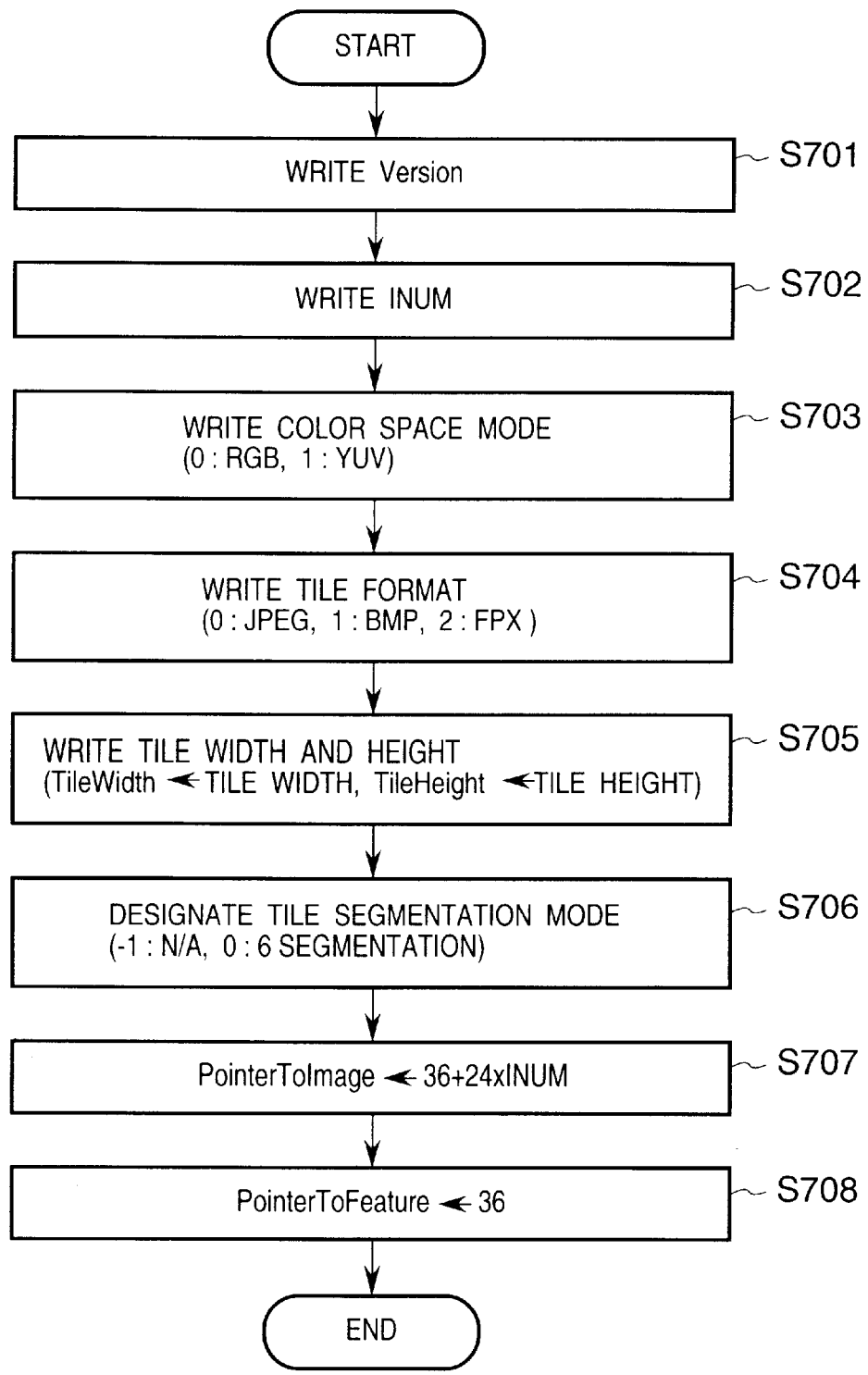
FIG. 7 is a flow chart for explaining an attribute information write procedure.

FIG. 7 is a flow chart for explaining the attribute information write procedure. That is, the procedure in FIG. 7 shows details of step S601 in FIG. 6. Assume that a write file is already open prior to the start of the processing shown in FIG. 7.

In step S701, a value (in this embodiment "3") indicative of the version of the file format is written in the area 301 of the attribute information area 201. In step S702, a value (in this embodiment "100") indicating the number of images to be processed is written in the area 302. In step S703, information (in this embodiment "0" because RGB space is used) indicating the mode (color space mode) of an image feature is written in the area 303.

In step S704, information (in this embodiment "0" because JPEG is employed) indicative of the image format to be written in the image data area 203 is written in the area 304. In step S705, the number of images (in this embodiment "384") indicative of the width of an image is written in the area 305, and the number of pixels (in this embodiment "256") indicating the height of an image is written in the area 306. In step S706, information (in this embodiment "0" indicating the segment-by-six mode) indicative of the segmentation mode when an image feature is calculated is written in the area 307.

Next, in step S707, the start address of the image data area 203 is calculated from the number of images (INUM stored in the area 302) set in step S702, and the obtained value is written as PointerToImages in the area 308. In this embodiment, this value is 36+24×100=2436 because the number of images is 100, the size of the attribute information area 201 is 36 bytes (FIG. 3), and the subsequent feature data area 202 requires 24 bytes per image (FIG. 4).

In step S708, the start address of the image feature data area 202 is written in the area 309. In this embodiment, this image feature data area 202 is arranged to continue the attribute information area 201, so "36" is written as PointerToFeature.

Figure 8:
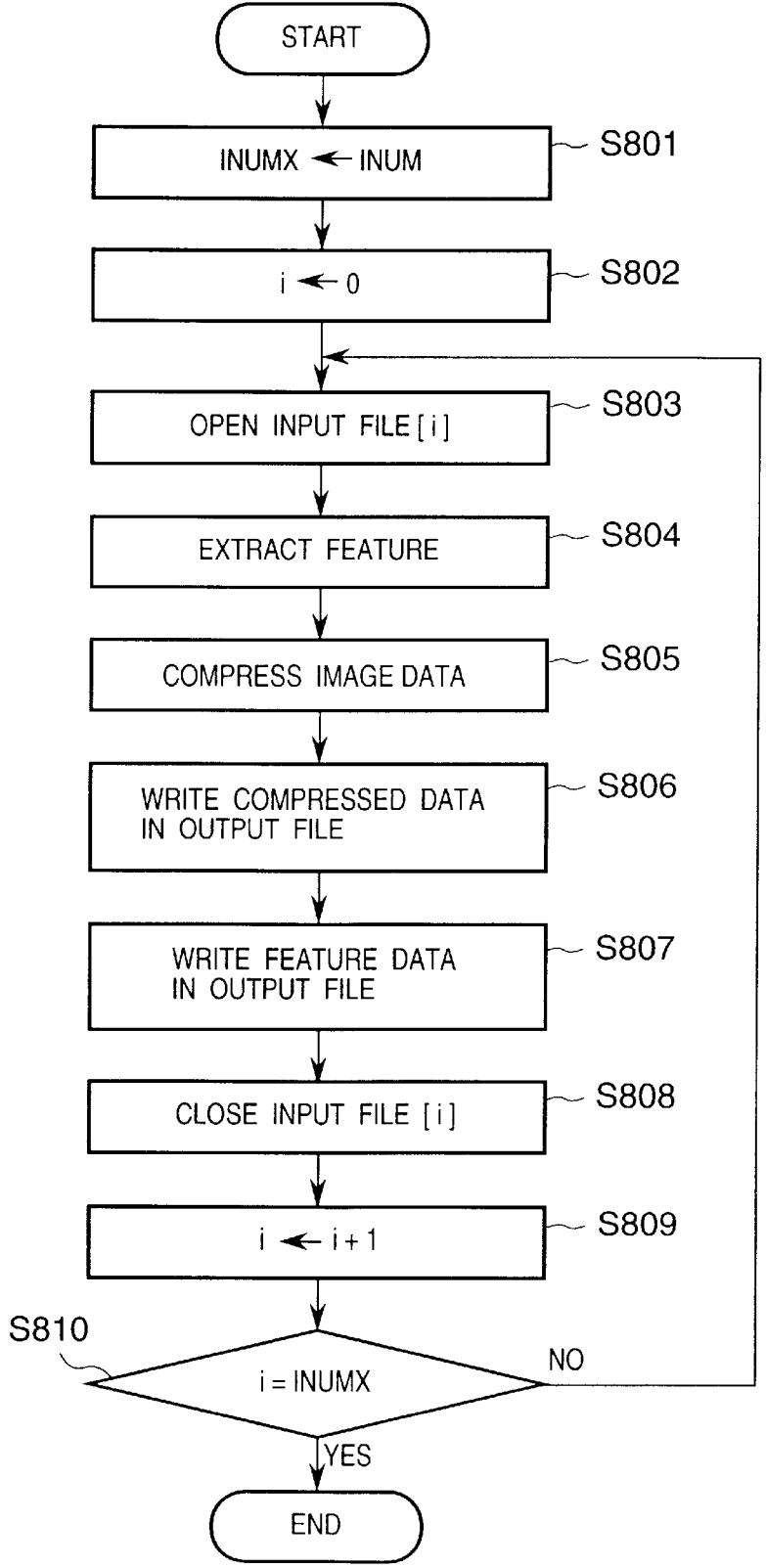
FIG. 8 is a flow chart for explaining an image data write procedure.

FIG. 8 is a flow chart for explaining the image data write procedure. That is, FIG. 8 shows details of step S602 in FIG. 6.

In step S801, the value 100 as the total number of images is set in a variable INUMX. In step S802, a variable i is initialized to 0.

In step S803, an input file (i) is opened. In step S804, a feature is extracted from the open image. Details of this feature extraction process will be described later. In step S805, the open image is compressed. The volume of the compressed data will be represented as SIZE hereinafter.

In step S806, the compressed data is written in an output file. The write position is uniquely calculated by cumulatively adding the volume SIZE of the compressed data on the basis of the pointer 308 indicating the start address of the image data area 203.

In step S807, a total of 24 bytes of feature data R(0,0), G(0,0), and B(0,0) to B(2,1) are written. The write position of the feature data can be calculated by the value of the pointer PointerToFeature, stored in the area 309 and indicative of the start address of the image feature data area 202, plus 24 times i, i.e., the pointer value+24×i.

In step S808, the input file (i) is closed. In step S809, i is incremented by 1. Instep S810, this i is compared with INUMX. If i and INUMX are unequal, the flow returns to step S803 to start processing the next input image file. If i and INUMX are equal, this process is completed.

Figure 9:
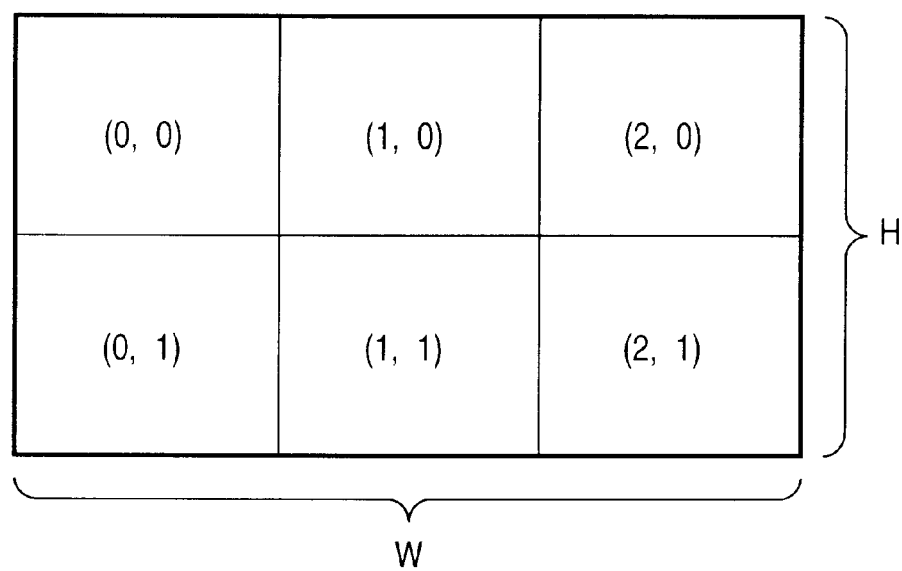
FIG. 9 is a view showing frame segmentation in feature calculations in the embodiment.

Next, the image feature calculation performed in step S804 will be described below. FIG. 9 is a view showing frame segmentation when the feature calculation is performed in this embodiment. As shown in FIG. 9, the dimensions of an image to be processed are W pixels in the horizontal direction and H pixels in the vertical direction. In this embodiment, this image is segmented into a total of six parts, i.e., three parts in the horizontal direction and two parts in the vertical direction, thereby forming an area (0,0), an area (1,0), . . . , an area (2,1) in order from the upper left portion. The average values of R, G, and B values in each area are calculated to obtain a total of 18 numerical values as an image feature.

Figure 10:
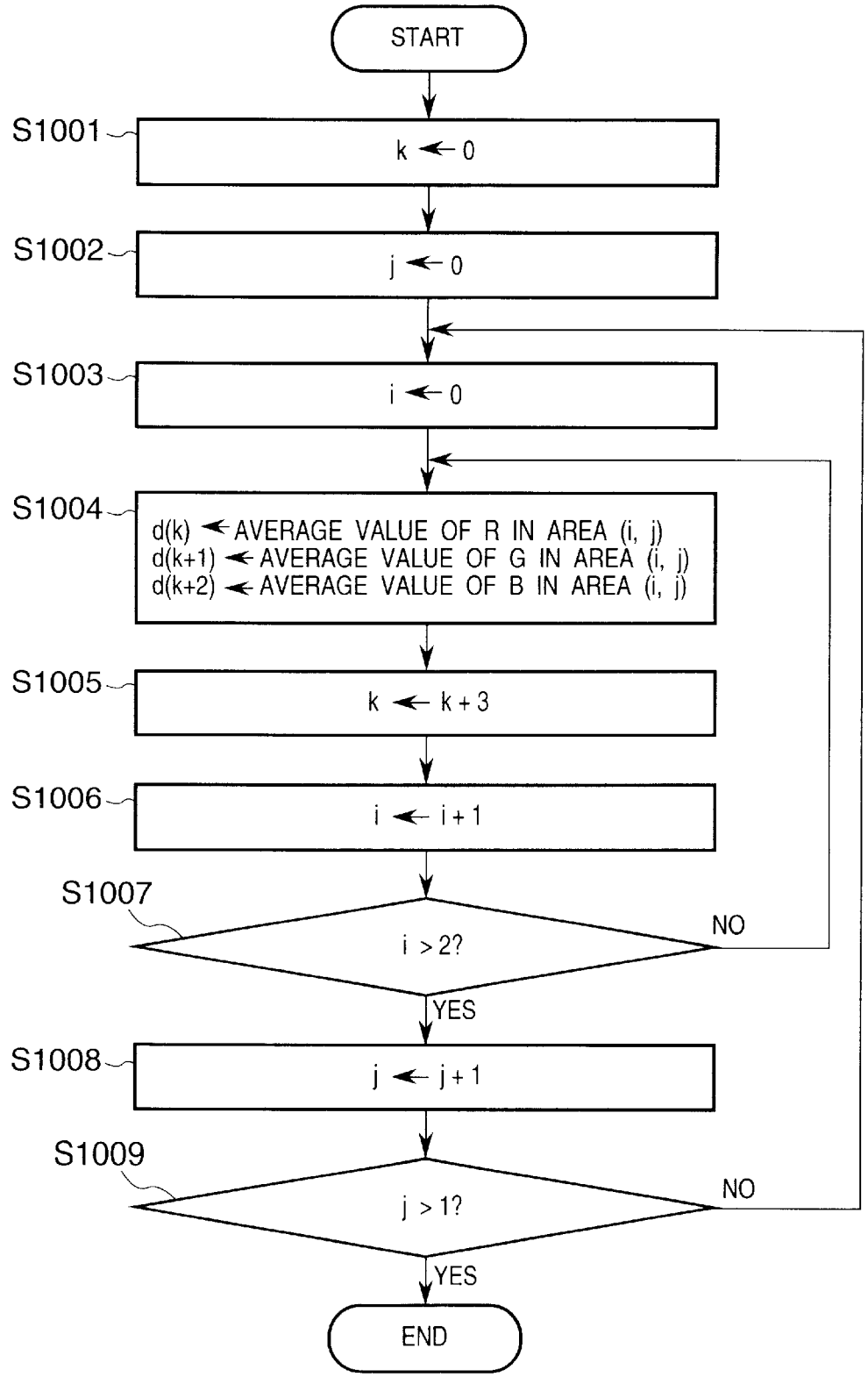
FIG. 10 is a flow chart for explaining a feature calculation process in the embodiment.

FIG. 10 is a flow chart for explaining the feature calculation process according to this embodiment. First, variables k, j, and i are initialized to 0 in steps S1001, S1002, and S1003, respectively.

Next, in step S1004, the average value of R values in an area (i,j) is substituted into a kth element d(k) in an array d. Similarly, the average value of G values is substituted into d(k+1), and the average value of B values is substituted into d(k+2). Note that a method of calculating the average values of R, G, and B values will be described later using the flow chart in FIG. 11.

In step S1005, k is incremented by 3. In step S1006, i is incremented by 1. In step S1007, i is compared with 2. If i is larger than 2, the flow advances to step S1008; if not, the flow returns to step S1004.

If i is larger than 2, this represents that this segmented row is completely processed, so the flow advances to the next segmented row. Accordingly, in step S1008 j is incremented by 1. In step S1009, this j is compared with 1. If j is larger than 1, this indicates that the second segmented row is completely processed, i.e., all of this frame is completely processed. Therefore, this process is completed. If not, the flow returns to step S1003 to process a new segmented row.

When the above process is completed, the image feature of an image to be processed is stored in the array d( ) having 18 elements.

In this embodiment, an image is segmented into six equal rectangular areas to calculate the feature. However, it is also possible to segment an image into more complicated shapes than rectangles or increase or decrease the number of segmented areas. It is to be readily understood that when the number of segmented areas is increased or decreased, the number of feature elements is not 18 but increases or decreases accordingly.

Figure 11:
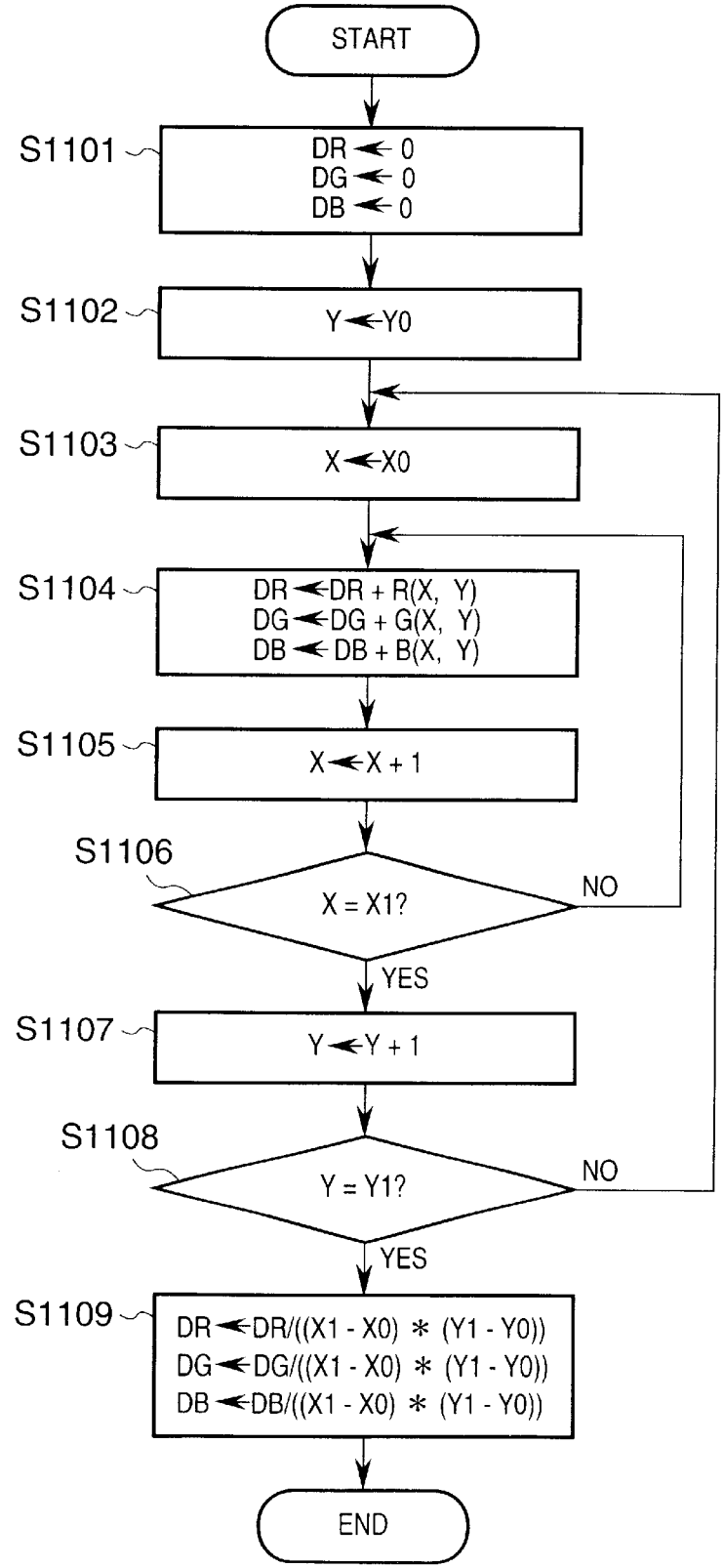
FIG. 11 is a flow chart for explaining a method of calculating the average values of R, G, and B values in each area.

Next, the method of calculating the average values of R, G, and B values will be described in more detail below. FIG. 11 is a flow chart for explaining the method of calculating the average values of R, G, and B values in each area. Assume that image data is stored in three arrays R (X, Y), G(X,Y), and B(X,Y) for $0 \leq X<W$, and $0 \leq Y<H$, wherein the upper left corner of the image is the origin (0,0).

In the process shown in FIG. 11, the average densities of partial areas $X0 \leq X<X1$ and $Y0 \leq Y<Y1$ are calculated, and the average density values of R, G, and B are added to variables DR, DG, and DB, respectively.

In the processing shown in step S804 and FIG. 10, an area equivalent to the area (i,j) corresponds to $X0=W \times i/3, X1=W \times (i+1)/3$ $Y0=H \times j/2, Y1=H \times (j+1)/2$ Hence, the flow chart in FIG. 11 is executed after constants X0, X1, Y0, and Y1 are initialized as described above.

First, in step S1101, the variables DR, DG, and DB are initialized by 0. In step S1102, a variable Y is initialized by Y0 described above. Analogously, in step S1103 a variable X is initialized by X0 described above.

In step S1104, R(X,Y), G(X,Y), and B(X,Y) are added to DR, DG, and DB, respectively. In step S1105, the variable X is incremented by 1. In step S1106, this variable X is compared with X1. If they are equal, the flow advances to step S1107; if not, the flow returns to step S1104. In step S1107, the variable Y is incremented by 1. In step S1108, this variable Y is compared with Y1. If they are equal, the flow advances to step S1109; if not, the flow returns to step S1103. In the processes in steps S1103 to S1108 described above, the total value of R values, the total value of G values, and the total value of B values in the area specified by X0, X1, Y0, and Y1 are stored in DR, DG, and DG, respectively.

In step S1109, the variables DR, DG, and DB are divided by (X1−X0)×(Y1−Y0). This is to divide the value stored in each variable by the number of pixels in the area, i.e., calculate the average value. Accordingly, after the processing in step S1109, the contents of DR, DG, and DB indicate the average density obtained by dividing the total sum of the pixel densities in the area by the number of pixels.

Next, a method of search using the image feature and a method of reading out an image corresponding to the result of search will be described.

Figure 12:
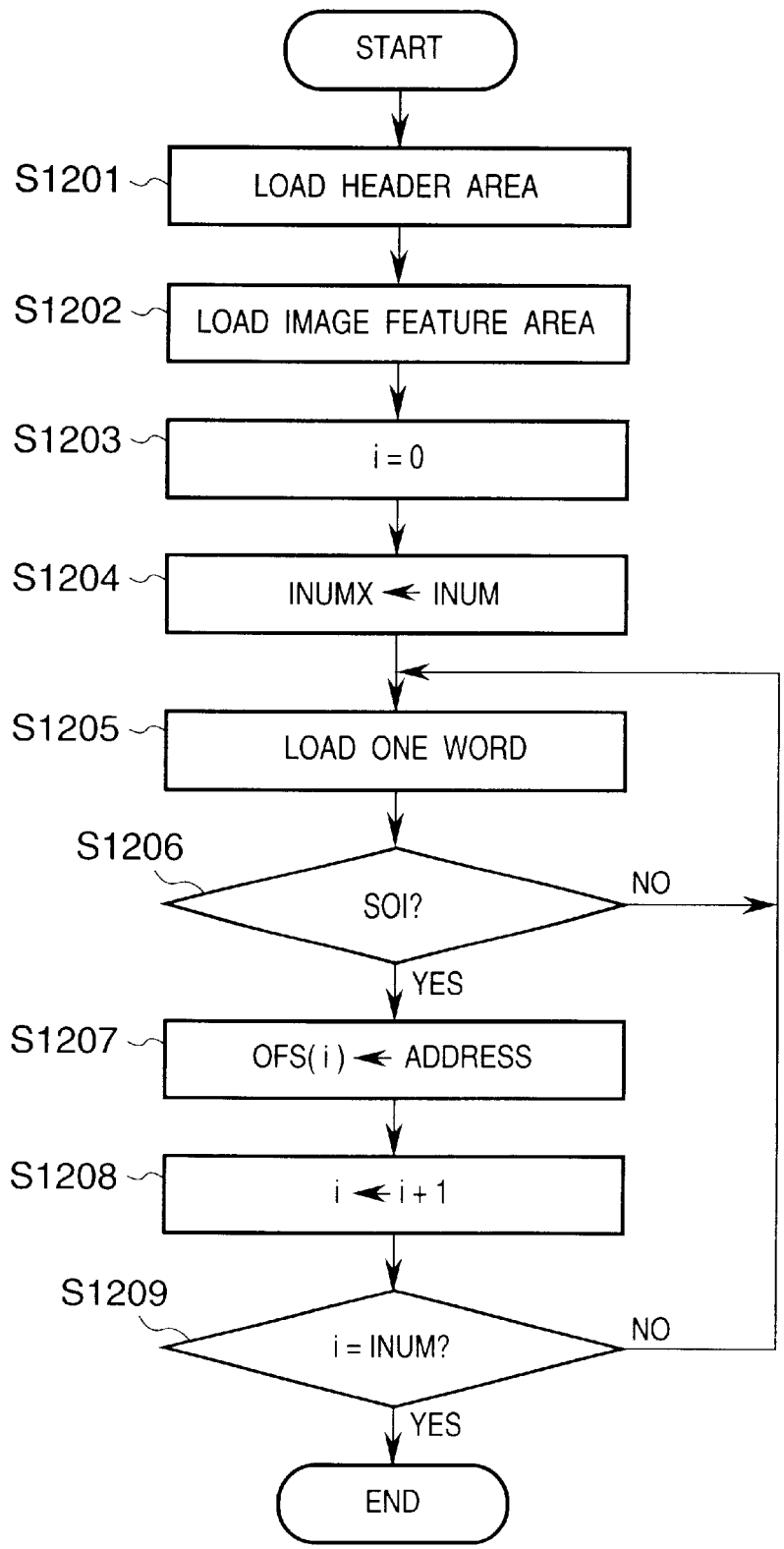
FIG. 12 is a flow chart showing processing performed prior to a search and read of image data.

FIG. 12 is a flow chart showing processing performed prior to a search and read of image data. In this processing, the attribute information area 201 and the image feature data area 202 of an image file are read out and stored in the memory 105. Additionally, the image data area 203 is scanned, and, whenever the SOI marker of JPEG is detected, the position of the marker is stored as an offset information array OFS ( ) in the memory, thereby generating position information of the image data as an array on the memory.

In step S1201, the attribute information area 201 is read out, thereby reading out the format version (Version) in the area 301, the number of images (INUM) in the area 302, the feature mode (Mode) in the area 303, the image format (IFormat) in the area 304, the image width (Iwidth) in the area 305, the image height (Iheight) in the area 306, the image segmentation mode (SectionMode) in the area 307, the pointer (PointerToImages) to the image data area in the area 308, and the pointer (PointerToFeatures) to the feature data in the area 309. Instep S1202, the feature data 401, 402, . . . , as shown FIG. 4 are read out from the feature data area 202 whose position is indicated by PointerToFeatures.

In step S1203, a variable i is initialized to 0. In step S1204, the number of images (INUM) obtained instep S1201 is set in a variable INUMX.

In step S1205, one word is read out from the start address of the image area. Instep S1206, whether the readout value is the SOI marker is checked. If the value is the SOI marker, the flow advances to step S1207; if not, the flow returns to step S1205 to read out the next word.

If the SOI is detected in step S1206, the flow advances to step S1207 to write the current read address in the ith element of the OFS array, i.e., in OFS(i). In step S1208, the variable i is incremented by 1. If instep S1209 the value of the variable i is equal to INUMX, this processing is completed; if not, the flow returns to step S1205 to repeat the above processing.

The image feature data thus obtained is used as a search target to perform search. Image data necessary to be displayed as a result of this search can be read out by calculating the read position from the OFS array.

Figure 13:
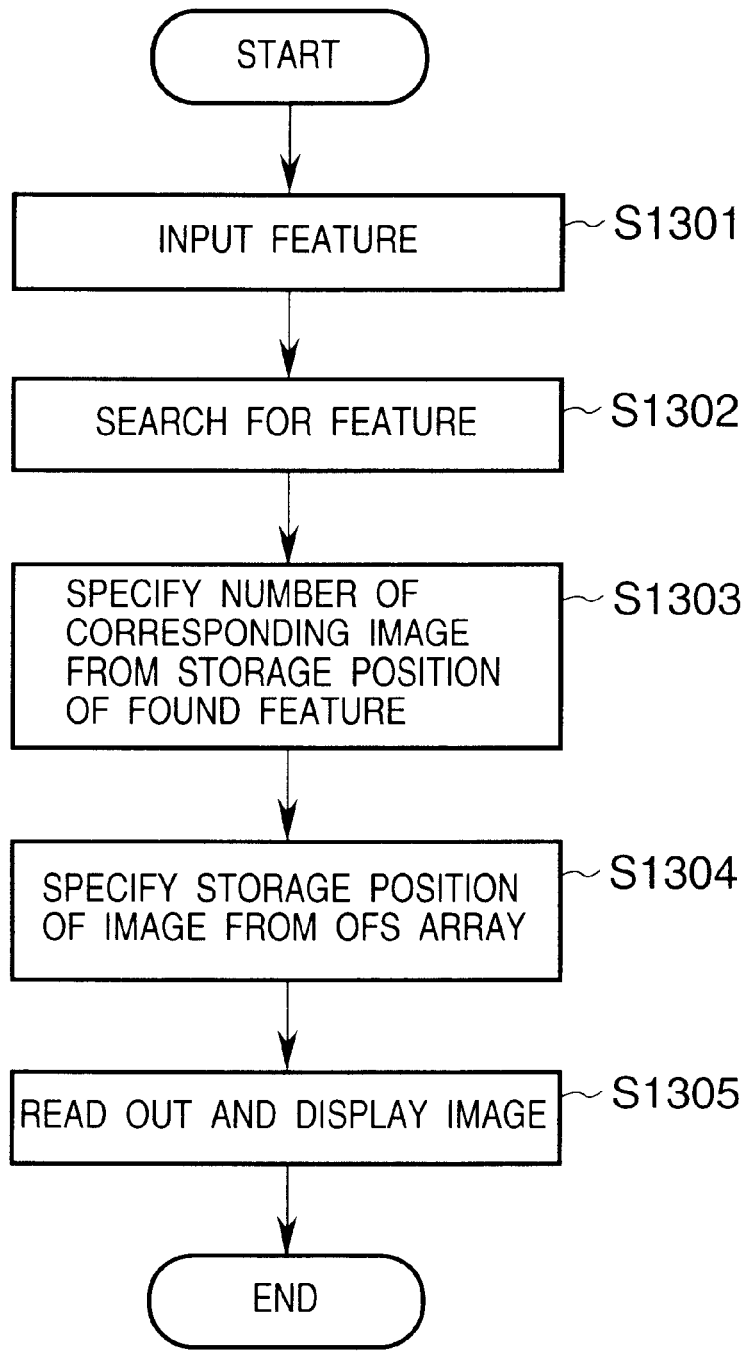
FIG. 13 is a flow chart for explaining a summary of an image search process according to the first embodiment.

FIG. 13 is a flow chart for explaining a summary of the image search process according to the first embodiment. In step S1301 of FIG. 13, the operator inputs the feature of an image as a search source by using, e.g., the keyboard 102. In step S1302, the image feature area loaded into the RAM instep S1202 described earlier is searched by the feature input in step S1301. If a hit image feature is found as a result of this search, the number of an image corresponding to this image feature is checked on the basis of the storage position in step S1303. In step S1304, the storage position (read position) of this image is acquired from the OFS array obtained by the processing explained in FIG. 12 described above. In step S1305, the image is obtained as a result of search and displayed.

In the first embodiment as described above, a single file contains attribute information describing information necessary to read out and display images, a feature data area continuously storing features of all images, and an image data area continuously storing all images. This realizes high-speed access to image data and simple management of image data. That is, if image data are stored in discrete files, these files must be opened for each access. In this embodiment, however, image data are collectively stored in one file, so a plurality of images can be successively accessed while the file is kept open. Also, in the conventional method in which image data are stored in discrete files, consistency must be kept between the storage locations of these discrete files and the feature data or the management of the feature data. By contrast, in this embodiment in which image data are collectively stored in one file, the storage location of each image data is always known wherever the file is moved.

<Second Embodiment>

Figure 14:
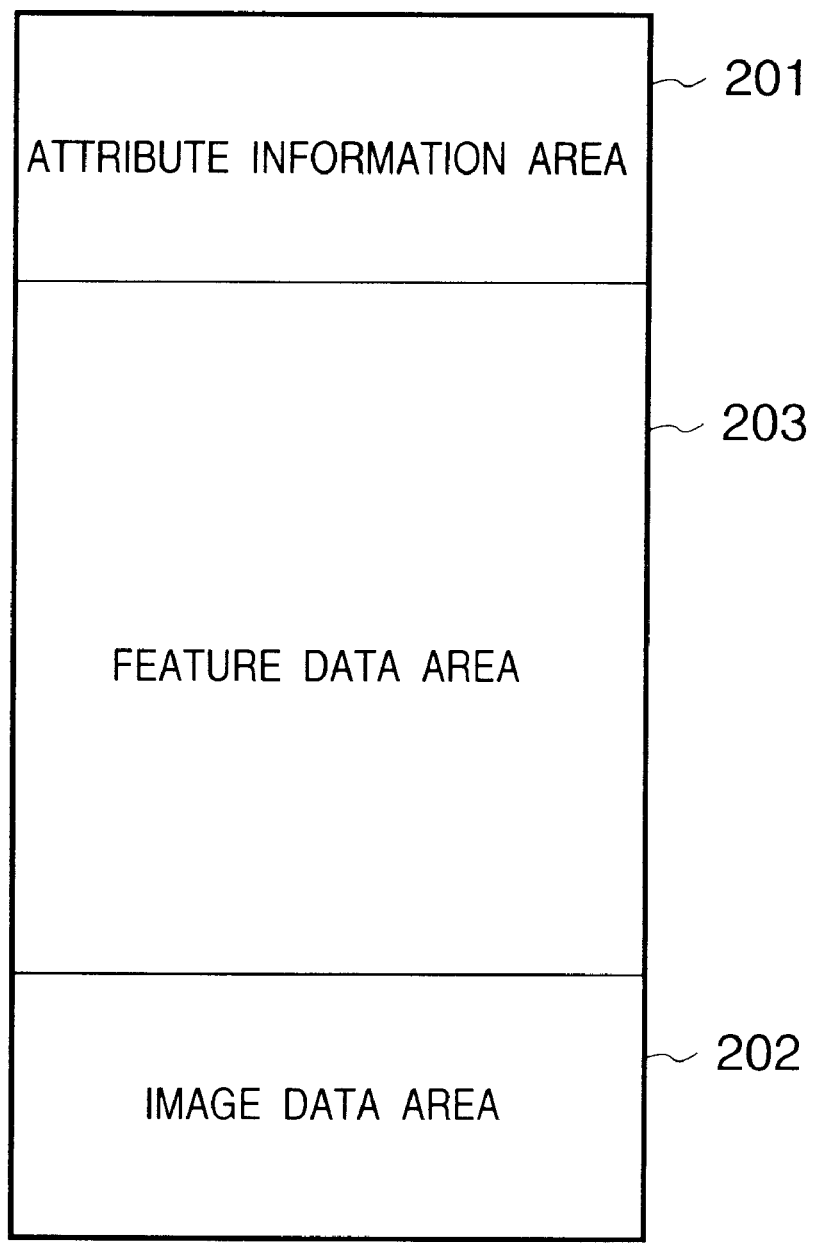
FIG. 14 is a view showing an outline of the data format of an image file formed by an image storage method according to the second embodiment.

The second embodiment will be described below. In the above first embodiment, in an image file the attribute information area 201, the feature data area 202, and the image data area 203 are arranged in this order. In the second embodiment, as shown in FIG. 14, an attribute information area 201, an image data area 203, and a feature data area 202 are arranged in this order. However, the contents of each area are the same as in the first embodiment; the attribute information area 201, the feature data area 202, and the image data area 203 have the contents shown in FIGS. 3, 4, and 5, respectively.

Figure 15:
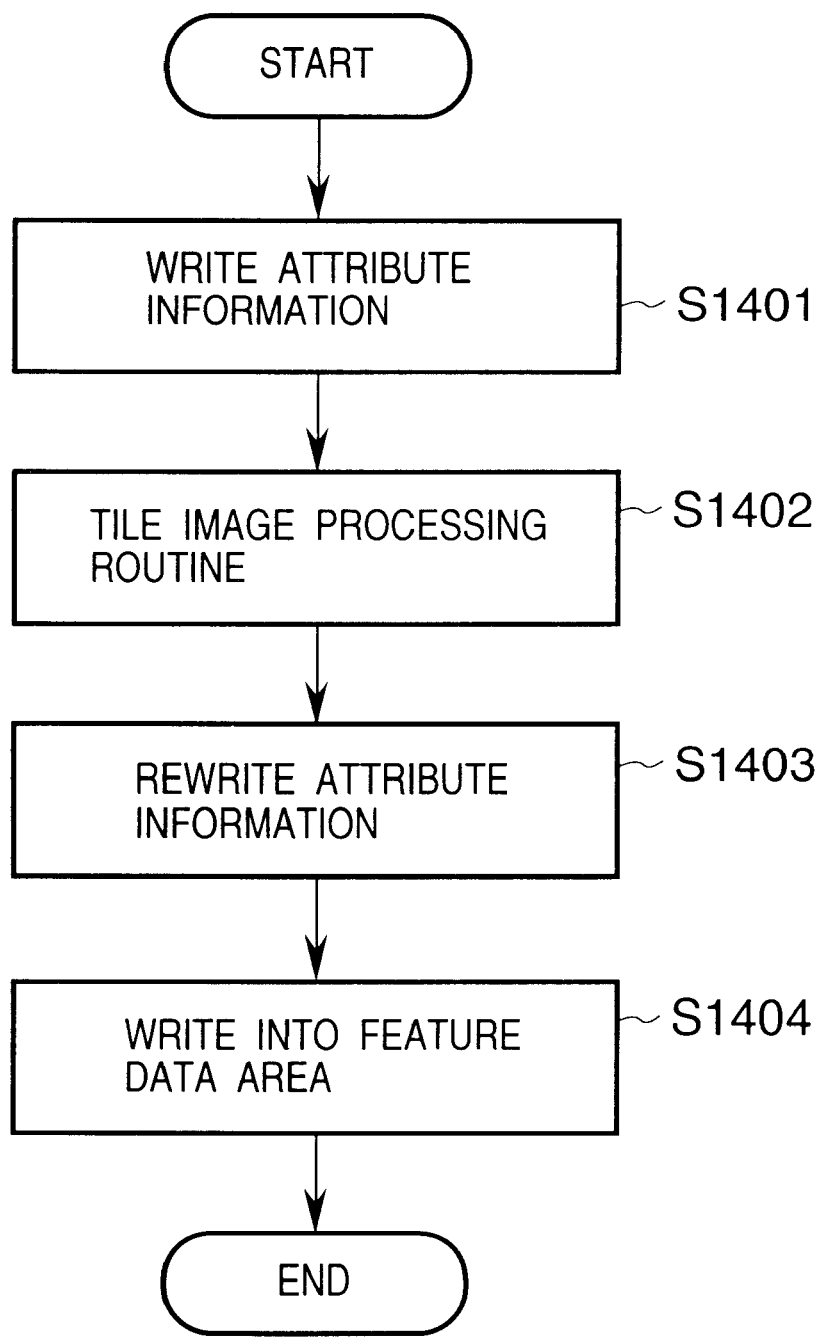
FIG. 15 is a flow chart showing a rough flow of an image file formation process in the second embodiment.

FIG. 15 is a flow chart showing a rough flow of an image file generation process in the second embodiment. In step S1401, data are written in a portion of the attribute information area 201. In step S1402, compressed data are written in the image data area 203 while image features are calculated. In step S1403, the write operation is again performed for the attribute information area 201 to write a pointer indicative of the start address of the feature data area 202. In step S1404, data are written in the feature data area 202.

Figure 16:
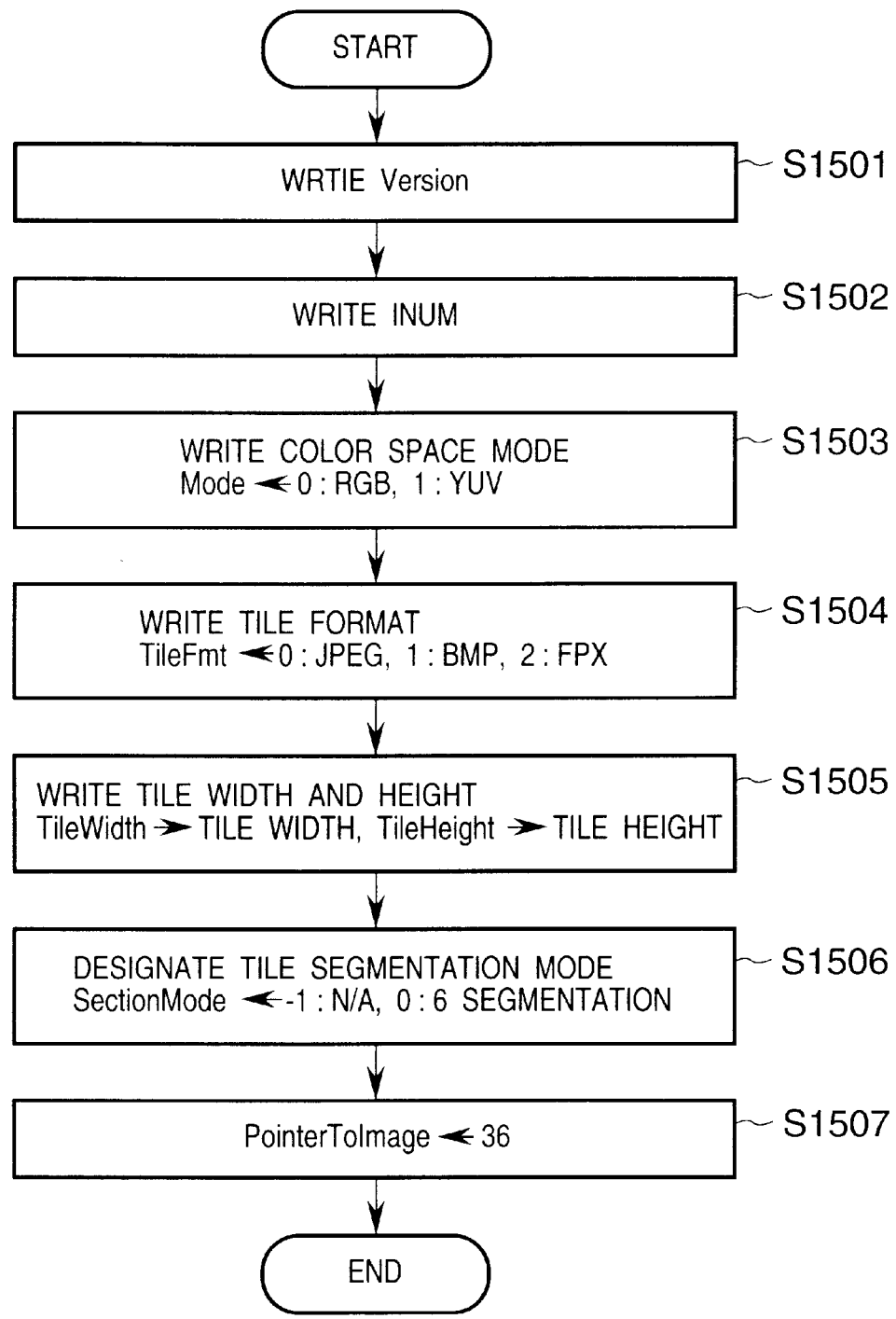
FIG. 16 is a flow chart for explaining an attribute information write process shown in step S1401 of FIG. 15.

FIG. 16 is a flow chart for explaining the attribute information write process shown in step S1401 of FIG. 15. From steps S1501 to S1506, the same processes as in steps S701 to S706 of the attribute information write process (FIG. 7) in the first embodiment are performed.

In step S1507, a value 36 is set in a pointer 308 to the image data area. This is so because the attribute information area 201 uses a 36-byte area as in the first embodiment, and the image data area 203 is located immediately after the attribute information area 201 as shown in FIG. 13.

Figure 17:
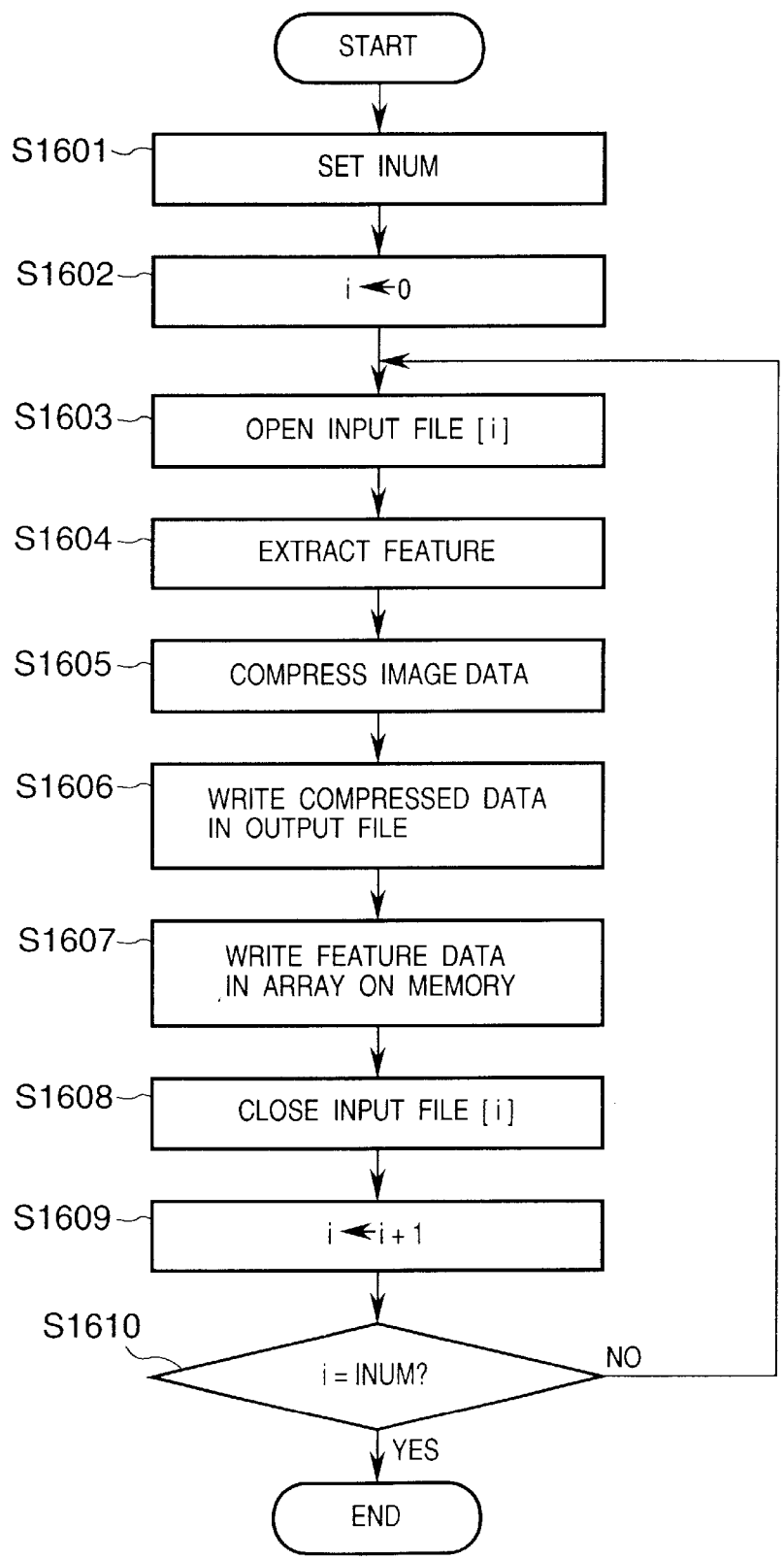
FIG. 17 is a flow chart for explaining details of tile image processing shown in step S1402 of FIG. 15.

FIG. 17 is a flow chart for explaining details of the tile image processing shown in step S1402 of FIG. 15. In this processing, processes in steps S1601 to S1610 are nearly identical with those in steps S801 to S810 explained in FIG. 8 of the first embodiment. The difference is that instep S1607, an array is temporarily written in a memory (RAM) because the position of feature data in an output file is uncertain.

When the process in step S1402 explained above is completed, the write to the image data area 203 is completed. Since the feature data area 202 is written immediately after this image data area 203, its address is the start address of the feature data area 202. Accordingly, in step S1403, the value is written as a pointer (PointerToFeature) to the feature data area into an area 309 of the attribute information area 201. Finally, in step S1404, the contents of the feature data array written in the RAM in step S1607 are written in an output file. In this manner, an image file is generated.

Figure 18:
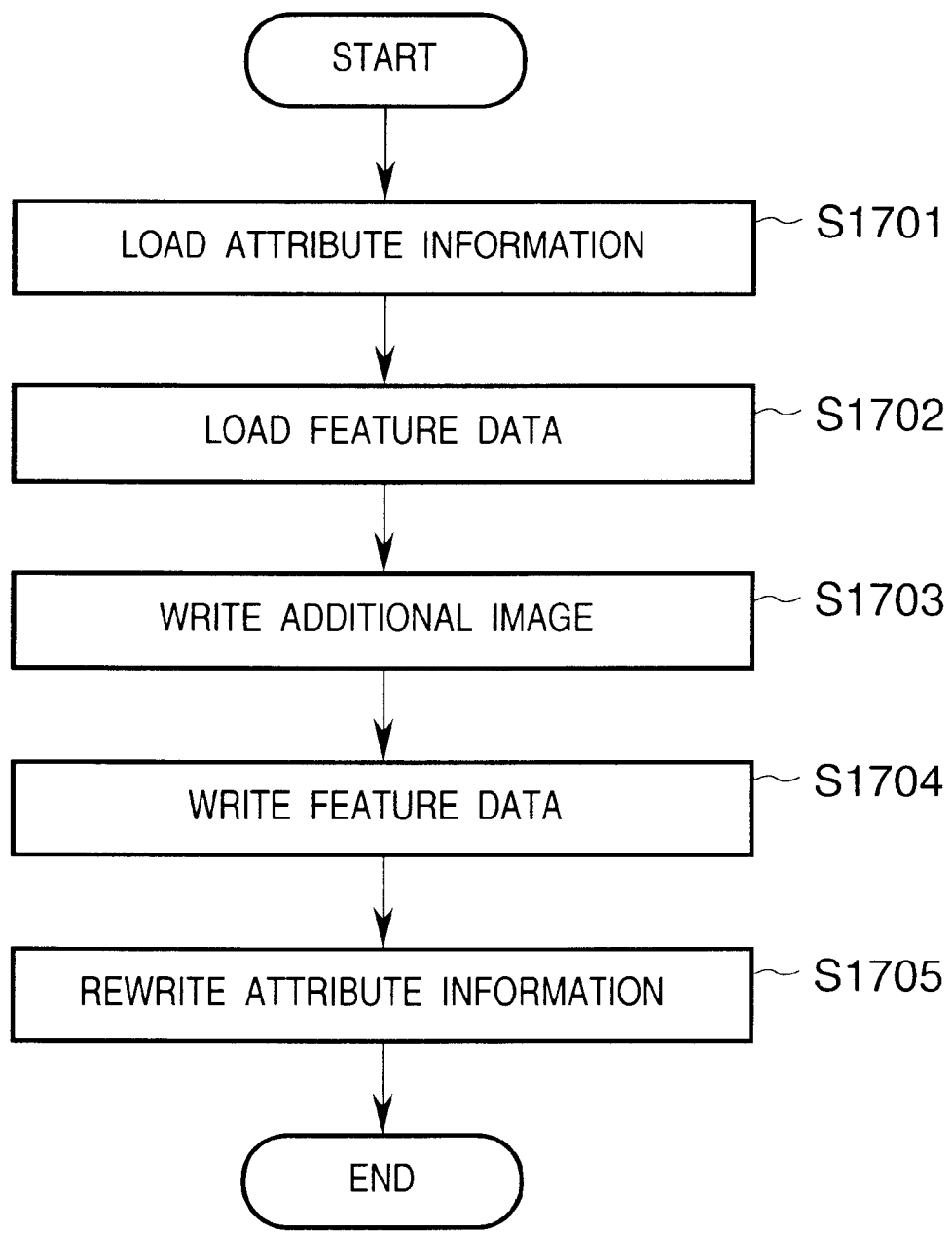
FIG. 18 is a flow chart showing a process of adding an image to an image file according to the second embodiment.

A process of adding an image to the image file formed by the above processing will be described below with reference to FIG. 18. FIG. 18 is a flow chart showing this process of adding an image to an image file according to the second embodiment.

In step S1701 of FIG. 18, data in the attribute information area 201 is read out from an existing file. In step S1702, data in the feature data area 202 is read out and temporarily saved in the memory. In step S1703, a new image to be added is written immediately after the image data area of the existing file. More specifically, the new image to be added is subjected to the feature extraction process (in step S1604 of FIG. 17) and the compression process (in step S1605 of FIG. 17). After that, the compressed image data is written immediately after the image data area of the existing file. An address immediately after this new image written is a new start address of the feature data area 202. In step S1704, the image feature data calculated by the abovementioned feature extraction process are added to the end of the array on the memory. The obtained data are collectively written in the output file from the new start address of the feature data area 202. In step S1705, the start address 309 of the feature data area in the attribute information area is updated.

In the second embodiment as described above, an image file is written in the order of an attribute information area, image data area, and feature data area. Consequently, in addition to the effects explained in the first embodiment, the effect of reducing the process of adding new image data can be obtained. The capacity of the feature data area is very small in comparison to the image data area. Image data can be added by temporarily saving this small-capacity portion into a memory, so the process is simplified, and the processing speed is increased. In contrast, when the area order of the first embodiment is used, it is necessary to save the image data area 203 into a memory in order to add image data.

(Third Embodiment)

Figure 19:
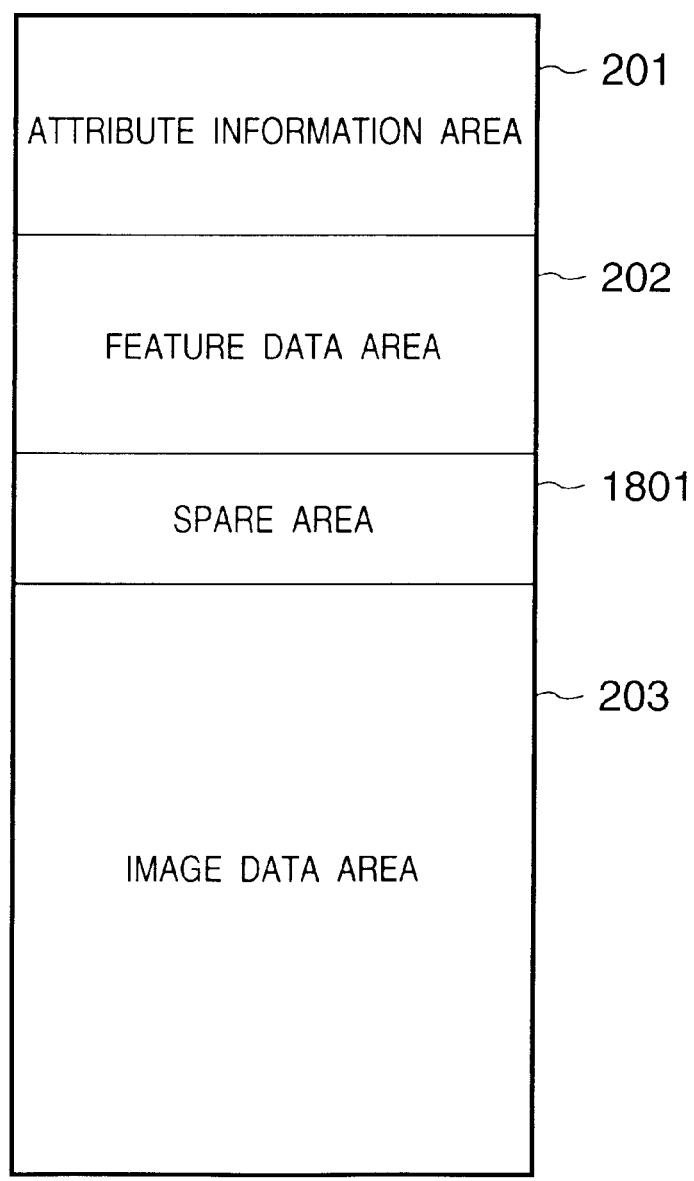
FIG. 19 is a view showing an outline of the data format of an image file formed by an image storage method according to the third embodiment.

In the above first and second embodiments, the attribute information area 201, the feature data area 202, and the image data area 203 are continuously formed. In the third embodiment, as shown in FIG. 19, a spare area 1801 is formed between a feature data area 202 and an image data area 203.

This spare area 1801 formed between the feature data area 202 and the image data area 203 allows easy addition of some image data even to an image file in which, as in the first embodiment, data are written in the order of an attribute information area 201, the feature data area 202, and the image data area 203. That is, image data can be added without saving the data of the image data area.

(Fourth Embodiment)

Figure 20:
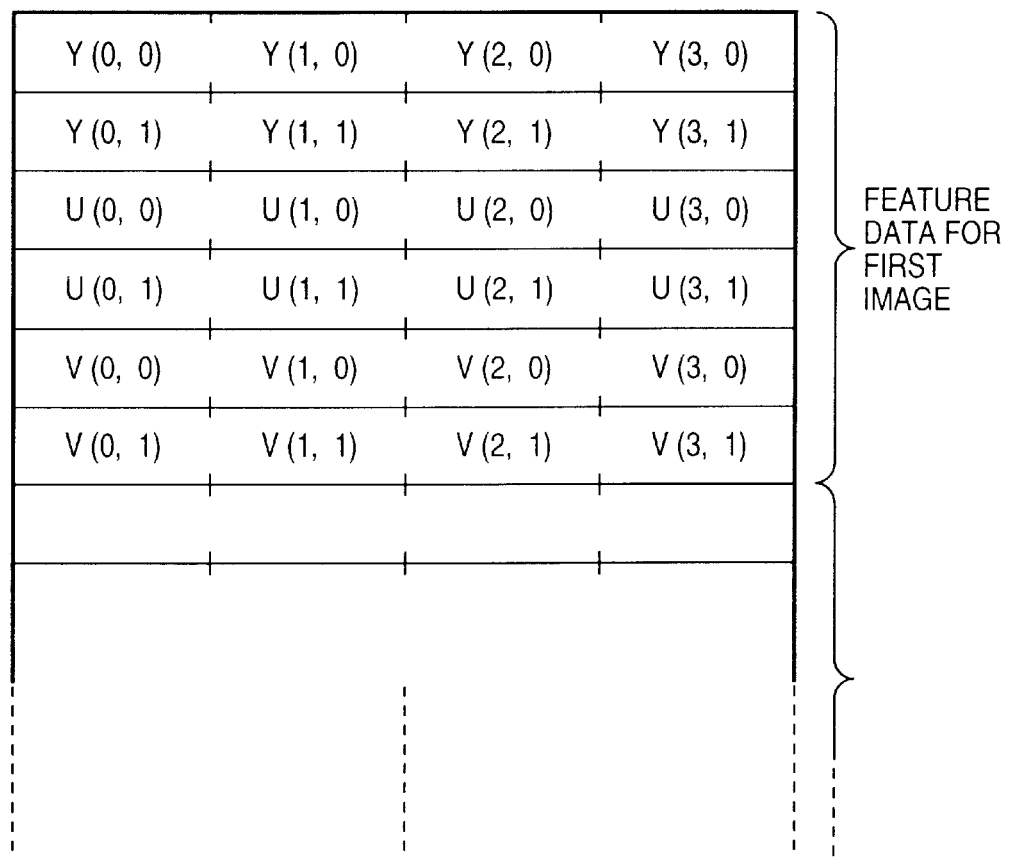
FIG. 20 is a view showing details of the data format of an image feature data area according to the fourth embodiment.

The fourth embodiment will be described below. In this fourth embodiment, feature data are calculated by segmenting a frame into eight parts and using YUV (luminance and chromaticity). In addition, as shown in FIG. 20, Y, U, and V are continuously stored, like YYYYYYYYUUUUUUUUVVVVVVVV, in a 24-byte feature data area per image.

If a feature is RGB, the value of each of R, G, and B is 0 to 255. In the case of YUV, however, Y is 0 to 255, and U and V are −128 to 127. That is, while the luminance Y is 0 or more, the chromaticity takes a value in the range of positive to negative values. In calculations, therefore, the luminance is processed as an unsigned integer, and the chromaticity is processed as a signed integer. Therefore, in assigning an 8-bit variable to each of the luminance and the chromaticity, for example, the luminance is defined by 8 unsigned bits (unsigned char) because it takes only positive values, and the chromaticity is defined by 8 signed bits (signed char) because it can take a value in the range of positive to negative value. When these variables are processed such that 8 data are simultaneously processed as in an MMX compatible CPU, collectively processing data whose signs are equally handled is easier. Accordingly, this handling is made very easy when data are stored like YYYYYYYYUUUUUUVVVVVV as shown in FIG. 20, or like YYYYYYYYUVUVUVUVUVUVUVUV.

Similarly, it is convenient for MMX operations to process features having a common range of values such that each result is a multiple of 8. Other combination examples are:

Y×16, U×8, V×8

Y×8, U×4, V×4

Y×8, (UV)×4

This holds for stimulus values L*, a*, and b* in uniform color space and three stimulus values XYZ, as well as for YUV.

In the first to fourth embodiments as described above, a single file contains attribute information describing information necessary to read out and display images, a feature data area continuously storing features of all images, and an image data area continuously storing all images. This realizes high-speed access to image data and simple management of the image data.

In the above embodiments, RGB values and luminance•chromaticity are used as features stored in the feature data area 202. However, features are not limited to these values. For example, it is obviously possible to use three stimulus values (XYZ), L* in uniform color space, and a* and b* in uniform color space as features.

In the above embodiments, compressed image data are stored in the image data area 203. However, as described earlier, bitmap image data, i.e., uncompressed image data can also be stored.

In the first embodiment, an image file has the attribute information area 201, the feature data area 202, and the image data area 203 in this order. In the second embodiment, an image file has the attribute information area 201, the image data area 203, and the feature data area 202 in this order. However, the storage order is not limited to these orders. For example, the attribute information area 201 can be stored at the end or in the middle of a file because only the position of the area need to be previously known.

As described above, each of the aforementioned embodiments achieves high-speed access to image data and simple management of the image data.

(Fifth Embodiment)

In the above first to fourth embodiments, to individually access image data stored in an image data area, it is necessary to count SOI (e.g., calculate OFS( )) to specify desired image data. In the fifth embodiment, access speed is increased by allowing a file to hold information indicating the position of each image data in an image data area. Note that the construction of an apparatus is similar to that shown in FIG. 1, so a detailed description thereof will be omitted.

Figure 21:
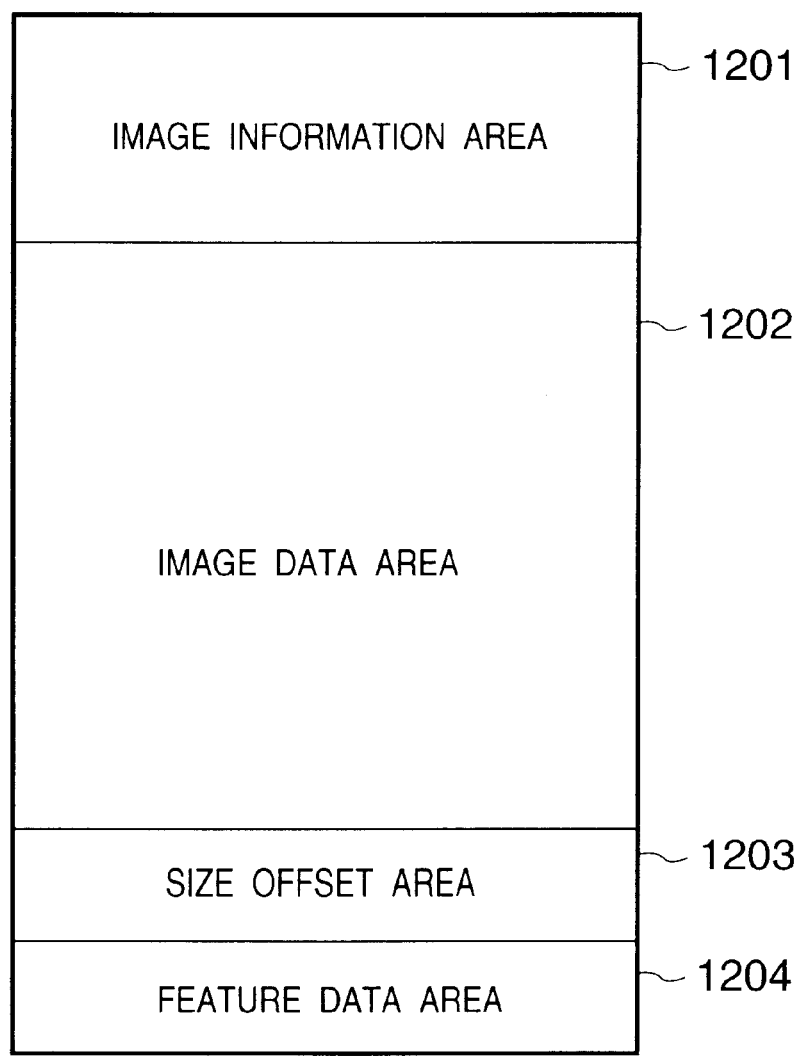
FIG. 21 is a view showing an outline of the data format of an image file formed by an image storage method according to the fifth embodiment.

FIG. 21 is a view showing an outline of the data format of an image file formed by an image storage method according to the fifth embodiment. Referring to FIG. 21, an image information area 1201 stores pieces of information, such as the number of images, a compression method, the numbers of vertical and horizontal pixels, and a feature extraction method, necessary to read out and display an image. An image data area 1202 continuously records all image data to be stored as this image file. A size offset area 1203 continuously stores data amounts of a plurality of images. A feature data area 1204 continuously records features (e.g., luminance•color difference information, image frequency, and histogram) of a plurality of images stored in the image data area 1202.

Figure 22:
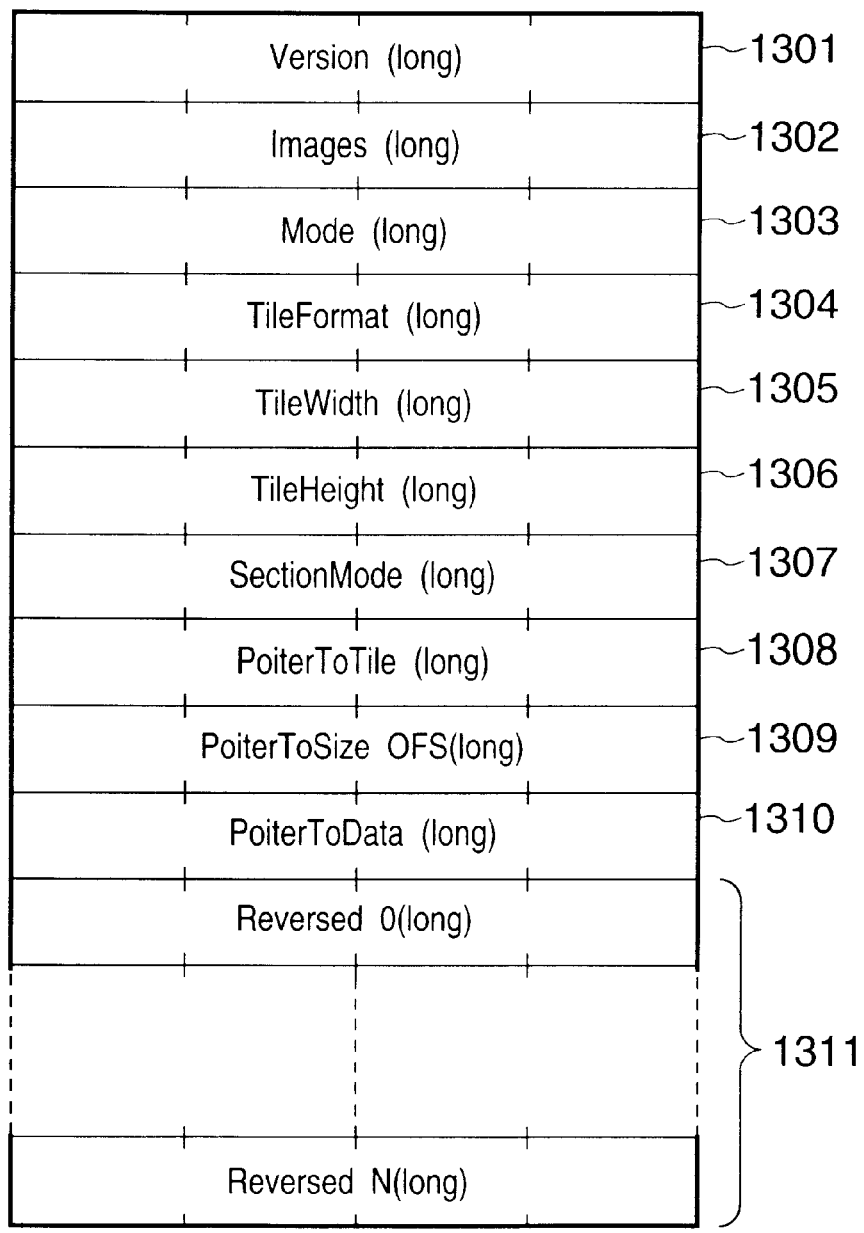
FIG. 22 is a view showing details of the data format of an image information area 1201 shown in FIG. 21.

FIG. 22 is a view showing details of the data format of the image information area 1201 in FIG. 21. In this embodiment, each area is composed of four bytes. However, the size of each area can also be changed in accordance with the number or size of images to be processed.

An area 1301 stores a version (Version) indicating the revision number of this image format. An area 1302 stores the number of images (Images) indicating the total number of recorded images. An area 1303 stores a mode (Mode) indicative of a value used as an image feature. For example, the type of image feature is represented by setting "0" in the area 303 when an RGB value is used as color difference information, or "1" when YUV is used. An area 1304 stores information (TileFormat) indicative of the format of an image stored in the image data area 1203. For example, values 0, 1, and 2 are set in TileFormat for JPEG, BMP, and FlashPix, respectively.

Areas 1305 and 1306 store information (TileWidth) indicating the width and information (TileHeight) indicating the height of images stored in the image data area 1203. Each information is represented by the number of pixels. An area 1307 stores information (SectionMode) indicating a method of segmenting a frame when a feature is to be calculated. In this embodiment, a value 0 is set when an image is segmented into six parts, and a value −1 is set when an image is not segmented, as will be described later.

An area 1308 stores a pointer (PointerToTile) indicating the start address of the image data area 1202. An area 1309 stores a pointer (PonterToSizeoFS) indicative of the start address of the size offset area 1203. An area 1310 stores a pointer (PointerToData) indicative of the start address of the image feature data area 1204. An area 1311 is a spare area composed of N×4 bytes. In this embodiment, the following explanation will be made by assuming N=5.

For example, if the image data area 1202 continues with no space immediately after the image information area 1201, "64" is stored as PointerToTile in the area 1308 because the image information area 1201 has 64 bytes in this embodiment. Note that the order of the pieces of information in the areas 1301 to 1311 is not restricted to the aforementioned order of this embodiment.

The data format of each area will be described below. Note that the data formats of the feature data area 1204 and the image data area 1202 are already described with reference to FIGS. 4 and 5, respectively, so detailed descriptions thereof will be omitted.

Figure 23:
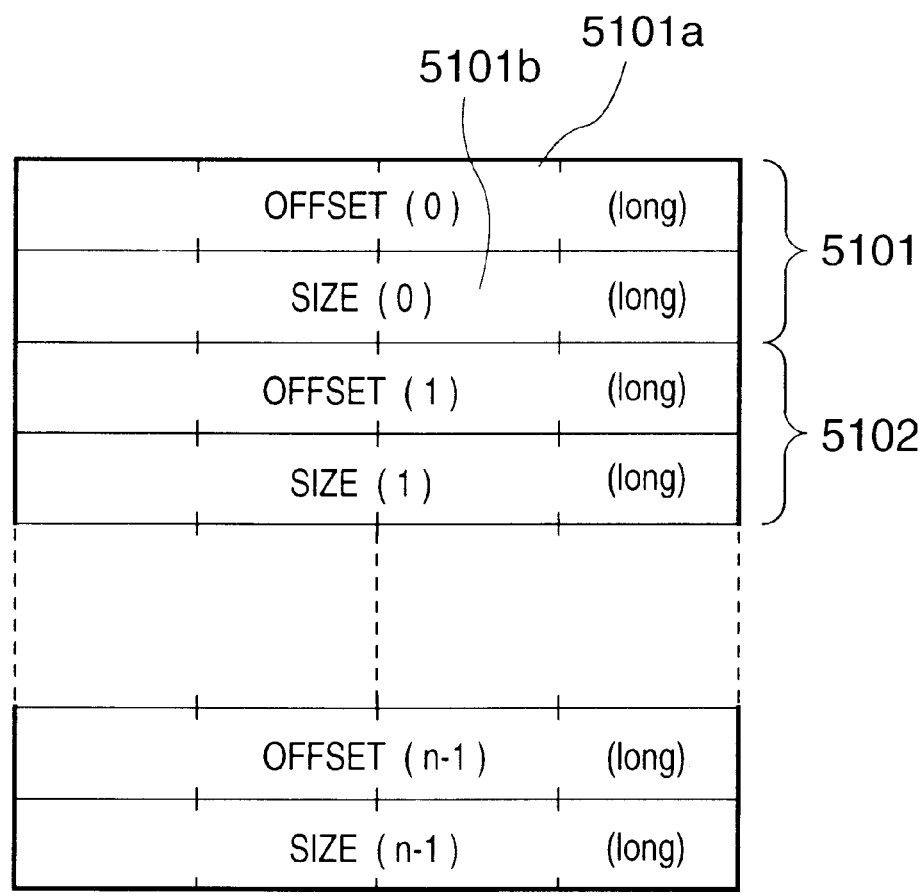
FIG. 23 is a view showing details of the data format of a size offset area 1203 shown in FIG. 21.

FIG. 23 is a view showing details of the data format of the size offset area 1203 shown in FIG. 21. Referring to FIG. 23, an area 5101 stores the start position (5101*a*) and the data amount (5101*b*) of the first image. Likewise, areas 5102, 5103, . . . , store the start positions and data amounts of subsequent image data. In this manner, the size offset area 1203 stores the start positions (offsets) and the data amounts (sizes) of n image data.

Next, a process procedure of forming a file by writing data with the aforementioned format in a hard disk 106 or a floppy disk 107 will be described below. Assume that the version number indicating the revision number of this image format is 3, the number of images is 100, the feature mode is RGB, the image format is JPEG, the image size is width×height=384×256, and the feature extraction is the segmentation mode (segment-by-six).

Figure 24:
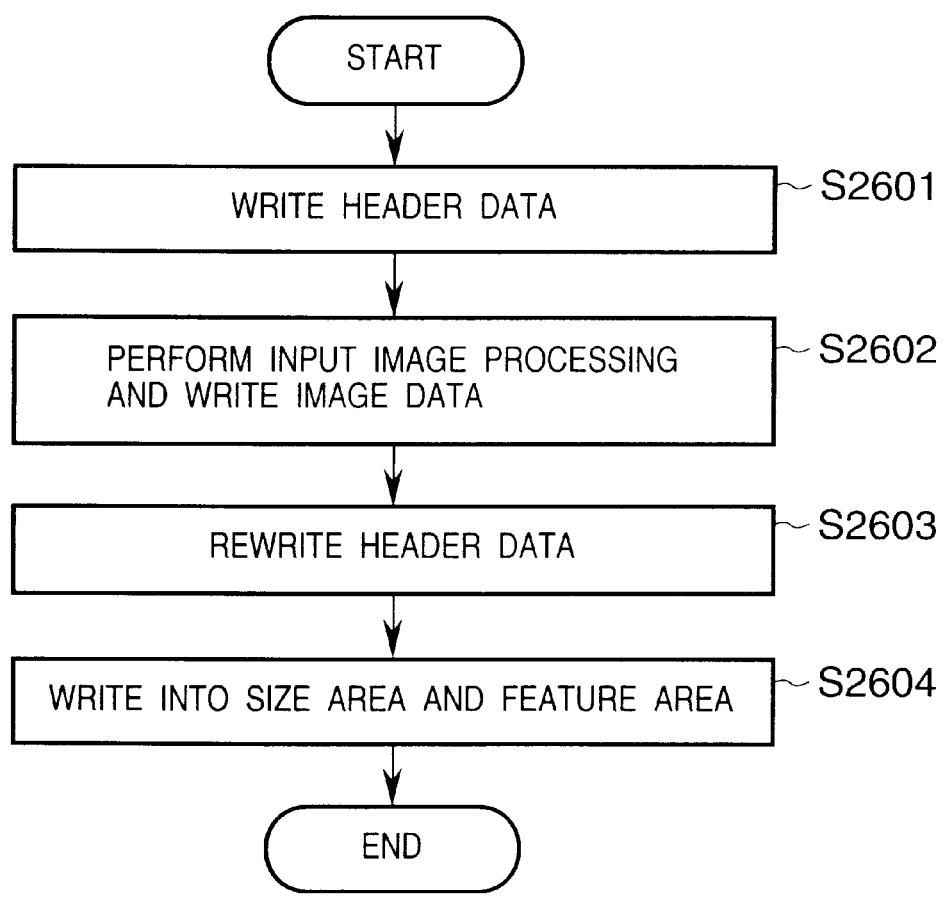
FIG. 24 is a flow chart showing an outline of an image file formation process according to the fifth embodiment.

FIG. 24 is a flow chart for explaining the image file generation process in the fifth embodiment. In step S2601 of FIG. 24, header data is written in the image information area 1201. In step S2602, image data are processed and written in the image data area 1202. In step S2603, header data is rewritten in the image information area 1201. In step S2604, data are written in the size offset area and the feature area.

Each process shown in FIG. 24 will be described in more detail below.

Figure 25:
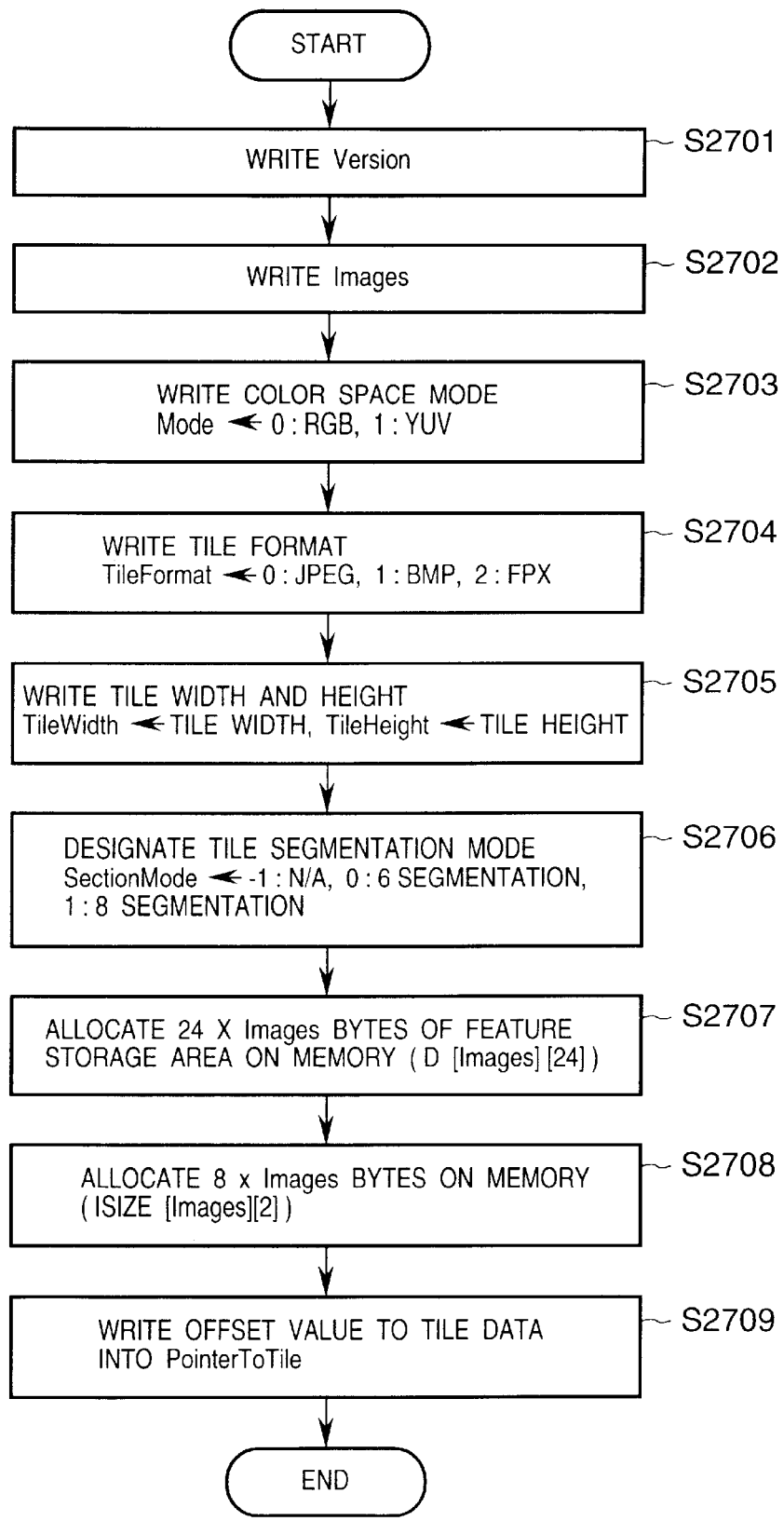
FIG. 25 is a flow chart for explaining details of a header data write process in step S2601 of FIG. 24.

FIG. 25 is a flow chart for explaining details of the header data write process in step S2601 of FIG. 24. Assume that an image file to be written is already open before the execution of this process.

In step S2701, a value (in this embodiment "3") indicative of the version (Version) of the file format is written in the area 1301 of the image information area 1201. In step S2702, the number of images (in this embodiment "100") to be stored in this image file is written in the area 1302. In step S2703, 0 (RGB) or 1 (YUV) is written in the area 1303 as the image feature mode (in this embodiment "0" is written because RGB is used). In step S2704, 0 is written in the image format 1304 of the image data area 1203. Note that the term "tile" in this flow chart means each image stored in the image data area. In step S2705, the image width (Tile Width) (in this embodiment "384") and the image height (Tile Height) (in this embodiment "256") are written in the areas 1305 and 1306, respectively. In step S2706, a value indicative of the segmentation mode when the image feature is calculated is written in the area 1307. In this embodiment, −1, 0, and 1 are stored for the non-segmentation mode, segment-by-six mode, and segment-by-eight mode, respectively. Since this embodiment employs the segment-by-six mode, 0 is written in the area 1307.

In step S2707, an area for temporarily storing feature data stored in this image file is allocated on a memory (RAM 105). In this embodiment as shown in FIG. 4, feature data using a 24-byte area is stored for each image, so the area to be allocated on the memory is 24 bytes×number of images. This number of images corresponds to the number of images (Images) set in the area 1302 in step S2702. The area allocated in this step is used in the flow chart of FIG. 26 (to be described later) as a two-dimensional array, Image×24, called D [Images][24] (to be referred to as an array D hereinafter).

In step S2708, an area for temporarily storing the start position and data amount of each image is allocated on the memory. In this embodiment, as shown in FIG. 23, a 4-byte area is used for each of the start position and data amount of each image. Therefore, the area to be allocated on the memory is 8 bytes×number of images. This number of images corresponds to the number of images (Images) set in the area 1302 in step S2702. The area allocated in this step is used in the flow chart of FIG. 26 as a two-dimensional array, Image×2, called ISIZE [Images][2] (to be referred to as an array ISIZE hereinafter).

In step S2709, the start address pointer of the image data area 202 is written in the area 1308 (PointerToTile). In this embodiment, the image information area 1201 has 64 bytes, and the image data area is arranged immediately after this image information area 1201. Accordingly, "64" is written in the area 1308.

Figure 26:
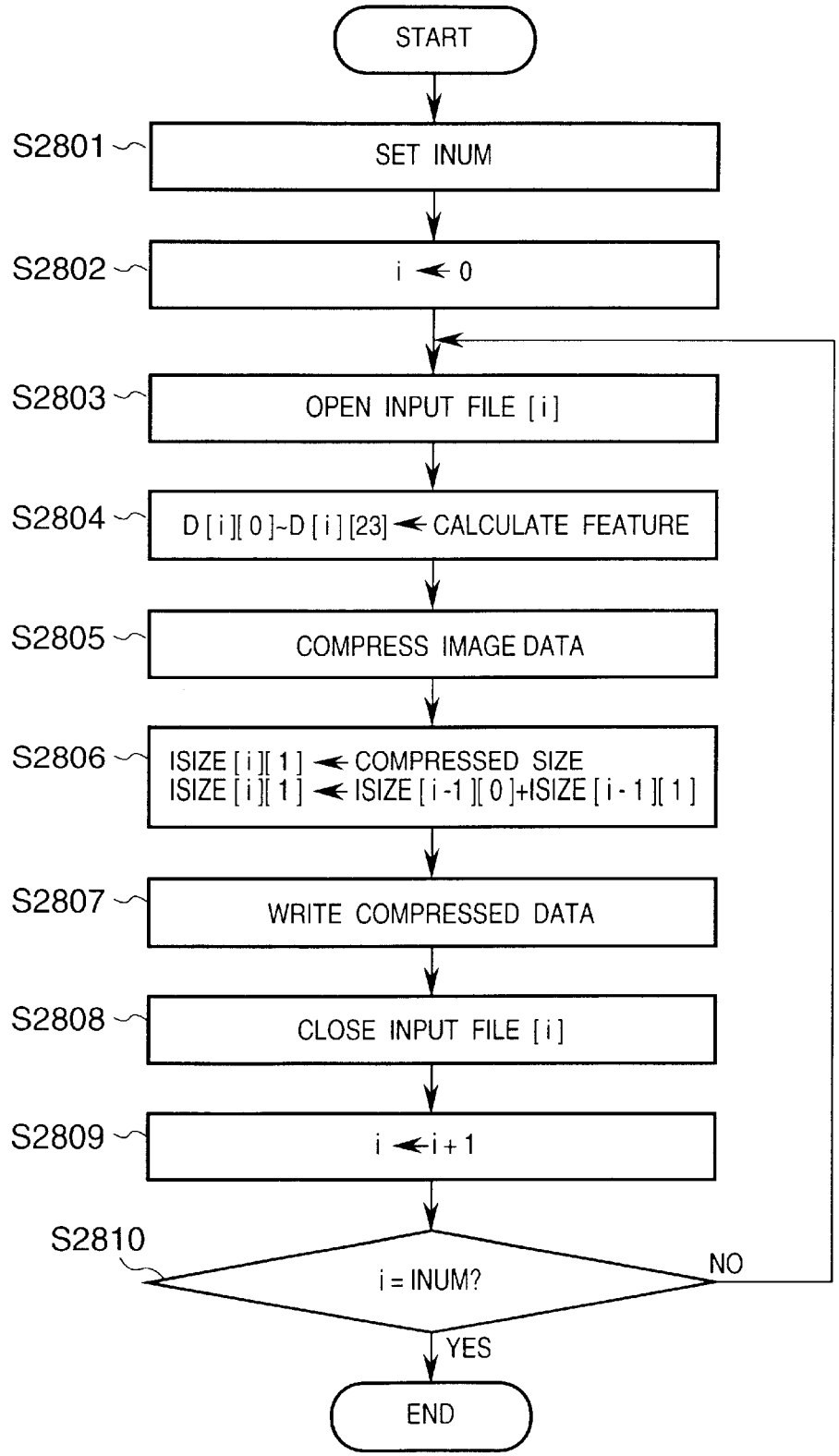
FIG. 26 is a flow chart for explaining a detailed procedure of processing in step S2602 of FIG. 24.

FIG. 26 is a flow chart for explaining a detailed procedure of the process in step S2602 of FIG. 24.

In FIG. 26, a plurality of input image files are sequentially opened, and each image is subjected to image feature calculations, compression, and image data amount calculations after the compression. Additionally, since image data is continuously stored in the file, calculated image data amounts are cumulatively added to the start position of the image data area 1202, thereby calculating the start position of each image. After that, compressed data is written, the processing of one input image is completed, and the file is closed. This processing is performed for all input images.

In step S2801, the total number of images (the value stored in the area 1301 (Images), in this embodiment 100) is set in a variable INUMX. In step S2802, a variable i is initialized to 0.

In step S2803, an input file (i) is opened. In step S2804, features are calculated from the open image and stored in elements D[i][0] to D[i][23] of the array D in the temporary storage area allocated in step S2707. Details of this feature calculation process are already explained in FIGS. 9 to 11.

In step S2805, image data of the open file are compressed. The volume of the compressed data is SIZE. In step S2806, the volume SIZE of the compressed data is stored in an element ISIZE[i][1] of the array ISIZE in the temporary storage area allocated in step S2708. Also, the offset position of the ith compressed image data is calculated by adding ISIZE[I−1][0] and ISIZE[I−1][1] and substituted into ISIZE [i][0].

In step S2807, the compressed data is written in an output file. The write position of the first image is the pointer 1308 indicating the start address of the image data area 1202. Subsequent images are written such that each image data is continuously located immediately after the preceding image data. Note that the compressed data is written by the format explained in FIG. 5. In step S2808, the input file (i) is closed. In step S2809, the variable i is incremented by 1. In step S2810, this variable i is compared with INUMX. If i and INUMX are unequal, the flow returns to step S2803 to repeat the above process. If i and INUMX are equal, INUM image files are completely processed, so this process is completed.

Figure 27:
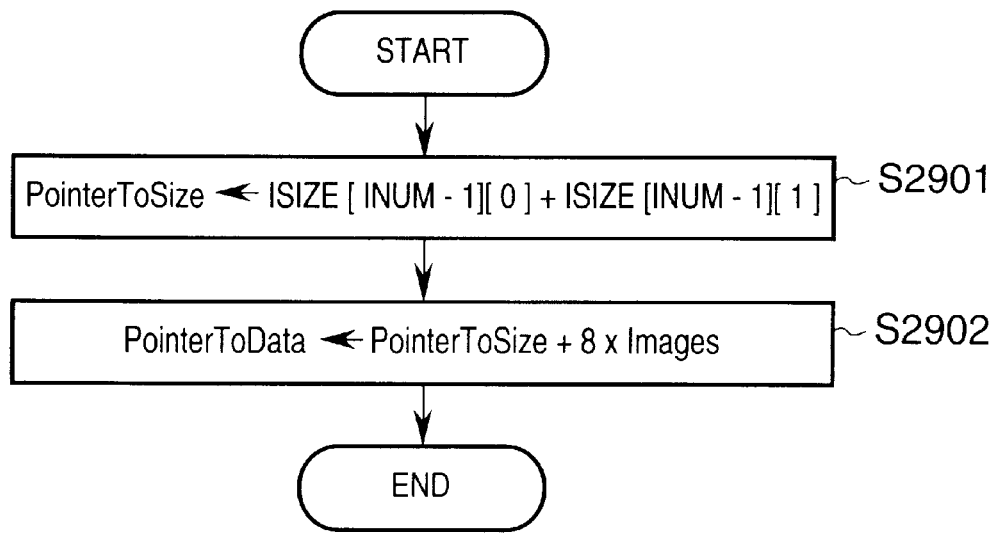
FIG. 27 is a flow chart showing details of a header data rewrite process in step S2603 of FIG. 24.

Next, the processing in step S2603 of FIG. 24 will be described. FIG. 27 is a flow chart showing details of the header data write process in step S2603 of FIG. 24.

In step S2901 of FIG. 27, the start address of the size offset area 1203 immediately after the image data area 1202 is calculated by adding the start position (ISIZE[INUM−1][0]) and the data amount (ISIZE[INUM−1][1]) of the last image, i.e., the 100th image in this embodiment. The calculated value is written in the area 1309 as the pointer PointerToSizeOFS indicating the start address of the size offset area 1203 in the image information area 1201.

In step S2902, the capacity of the size offset area 1203, i.e., 8 bytes×number of images (Images), is added to the value of the start address pointer 1309 of this size offset area 1203, and the calculated value is written in the area 1310 as the pointer PointerToData indicative of the start address of the feature data area 1204.

Figure 28:
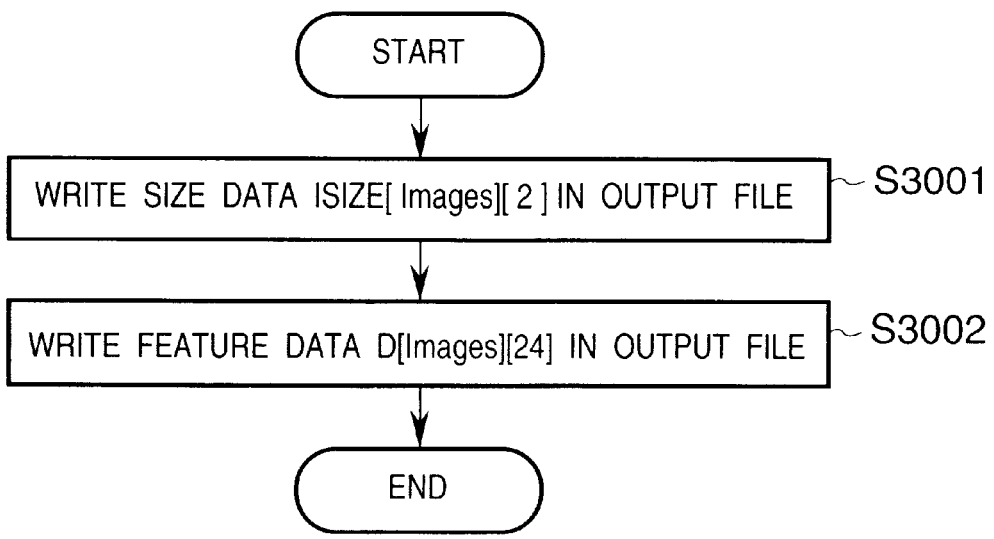
FIG. 28 is a flow chart for explaining a size area•feature area write process in step S2604 of FIG. 24.

The size area•feature area write process in step S2604 of FIG. 24 will be described below with reference to the flow chart in FIG. 28.

In step S3001, the array ISIZE[Images][2], which is allocated on the memory and in which predetermined data is stored by the processing in step S2806, is written in the size offset area 1203. The start address of write to this size offset area 1203 is the position indicated by PointerToSizeOFS stored in the area 1309. Subsequently, in step S3002, the array D[Images][24], which is allocated on the memory and in which the feature data is stored by the processing in step S2804, is written in the feature data area 1204. The start address of write to this feature data area 1204 is the position indicated by PointerToData stored in the area 1310.

Figure 29:
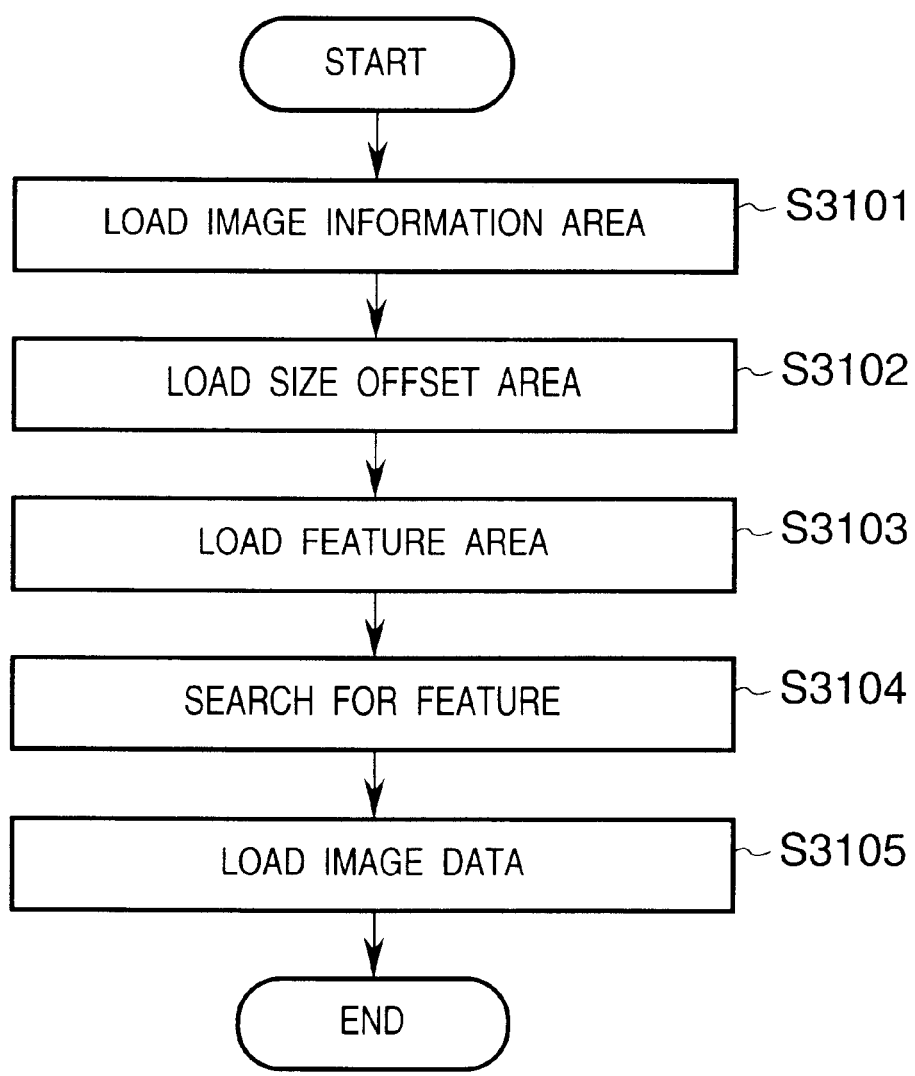
FIG. 29 is a flow chart for explaining an image data search process according to the fifth embodiment.

An example of a process of reading out desired image data from the image file formed as above will be described below. FIG. 29 is a flow chart for explaining an image data search process according to this embodiment.

In step S3101, the number 1302 of images, the pointer 1309 to the size offset area, the pointer 1310 to the feature data area, the pointer 1308 to the image data area, and the like are read out from the image information area. In step S3102, the contents of the size offset area 1203 are read out to the temporary storage area of the memory (RAM 105). In step S3103, the contents of the feature data area 1204 are read out to the temporary storage area of the memory (RAM 105). In step S3104, a given image feature (not shown) is compared with the contents of the feature data area stored in the memory, and the most similar data is extracted. In step S3105, a pointer to the start address of an image corresponding to the number found in step S3104 is acquired by looking up the contents of the size offset area stored in the memory in step S3102. On the basis of the acquired pointer to the start address of the image, a specified image is read out from the image data area of this image file and displayed.

In the fifth embodiment as described above, a single file contains header information describing information necessary to read out and display images, a feature data area continuously storing features of all images, and an image data area continuously storing all images. This realizes high-speed access to image data and simple management of the image data. Also, a size offset area for continuously storing the start position and data amount of each image is formed in an image file having a plurality of images. This allows rapid acquisition of the storage position of an image to be acquired. Consequently, the speed of access to an image file further increases.

<Sixth Embodiment>

In the above fifth embodiment, the size offset area 1203 stores both the start position and data amount of each image as shown in FIG. 23. However, the information stored in this size offset area 1203 can also be only one of the start position and data amount of each image. Especially when image data are continuously stored in the image data area 1202, one of the data amount and the start position is easily calculated from the other stored in the size offset area 1203.

Figure 30:
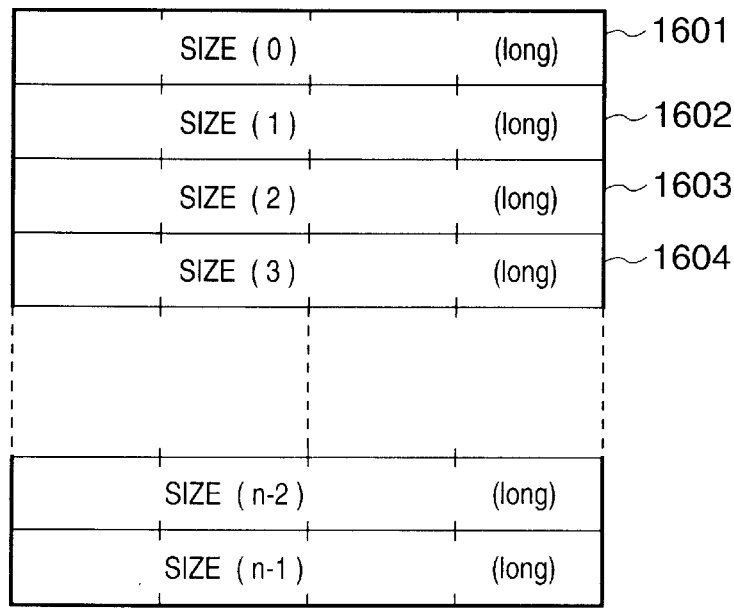
FIG. 30 is a view showing the data format of a size offset area 203 according to the sixth embodiment.

In this sixth embodiment, therefore, a size offset area 1203 stores only the data amount of each image. FIG. 30 is a view showing the data format of the size offset area 1203 according to the sixth embodiment.

In this arrangement, the capacity of the size offset area 1203 is halved, so the position of an image feature data area 1204 moves accordingly. Also, in step S2806 of FIG. 26 according to the fifth embodiment, the start position of size offset data of an image being processed is calculated from the data amount and start position of the immediately preceding image. In the sixth embodiment, however, this start position calculation is omitted. As a consequence, the size offset area 1203 is formed with the data format as shown in FIG. 30.

Furthermore, in the image read process of the fifth embodiment, the image data amount and start position are previously stored in the size offset area 1203 of an image file in step S3102 of FIG. 29, so it is only necessary to read out these data. In the sixth embodiment, however, the start position of each image must be calculated, by cumulatively adding the start position of an image data area and the data amount of each image, and held in a memory.

<Seventh Embodiment>

Figure 31:
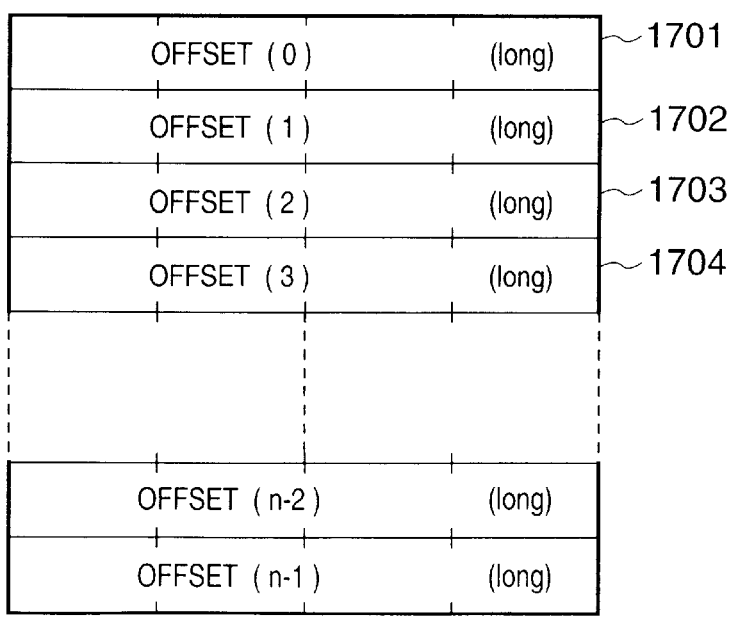
FIG. 31 is a view showing the data format of a size offset area 203 according to the seventh embodiment.

In the seventh embodiment, a size offset area 1203 stores only the start position of each image. FIG. 31 is a view showing the data format of the size offset area 1203 according to this seventh embodiment. In this arrangement, as in the sixth embodiment, the capacity of the size offset area 1203 is halved, so the position of an image feature data area moves accordingly.

Also, in the formation of an image file according to the fifth embodiment, the start position of an image being processed is calculated from the data amount and start position of the immediately preceding image in step S2806 of FIG. 26. In the seventh embodiment, however, no compressed sizes are stored. As a consequence, the size offset area 1203 having the data structure as shown in FIG. 31 is formed.

Furthermore, in the image read process of the fifth embodiment, the image data amount and start position are previously stored in a file in step S3102 of FIG. 29, so it is only necessary to read out these data. In the seventh embodiment, however, the data amount of each image must be calculated, from the difference in start position between this image and the next image, and held in a memory.

The fifth to seventh embodiments as described above allow high-speed access to image data and easy management of the image data.

<Eighth Embodiment>

If unnecessary image data is contained in an image data file as explained in the fifth to seventh embodiments described above, this image data must be deleted from the image data file. A method of deleting an unnecessary image will be described below.

The arrangement of an apparatus is analogous to that shown in FIG. 1, so a detailed description thereof will be omitted.

Figure 32:
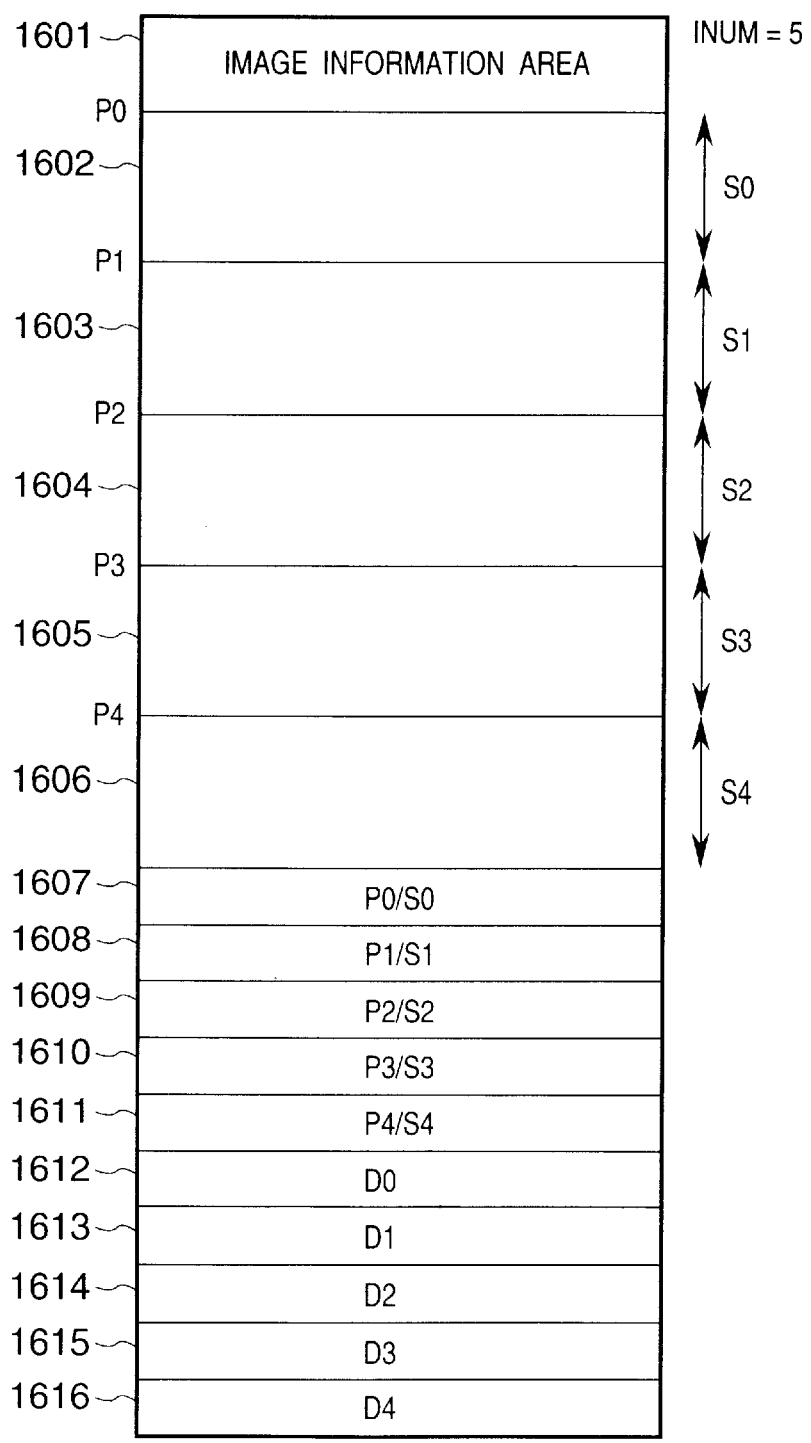
FIG. 32 is a view showing an example of the state of an image file before image deletion in the eighth embodiment.

FIG. 32 is a view showing an example of the state of an image file before deletion. This image file shown in FIG. 32 contains five images. An image information area 1601 corresponds to the image information area 1201 shown in FIG. 21.

Reference numerals 1602 to 1606 denote image data stored in an image data area 1202; 1607 to 1611, a size offset area 1203; P0 to P4, values of the start positions of the image data 1602 to 1606; S0 to S4, the data amounts of the image data 1602 to 1606; 1612 to 1616, an image feature data area 1204; and D0 to D4, the feature data of the image data 1602 to 1606.

Figure 33:
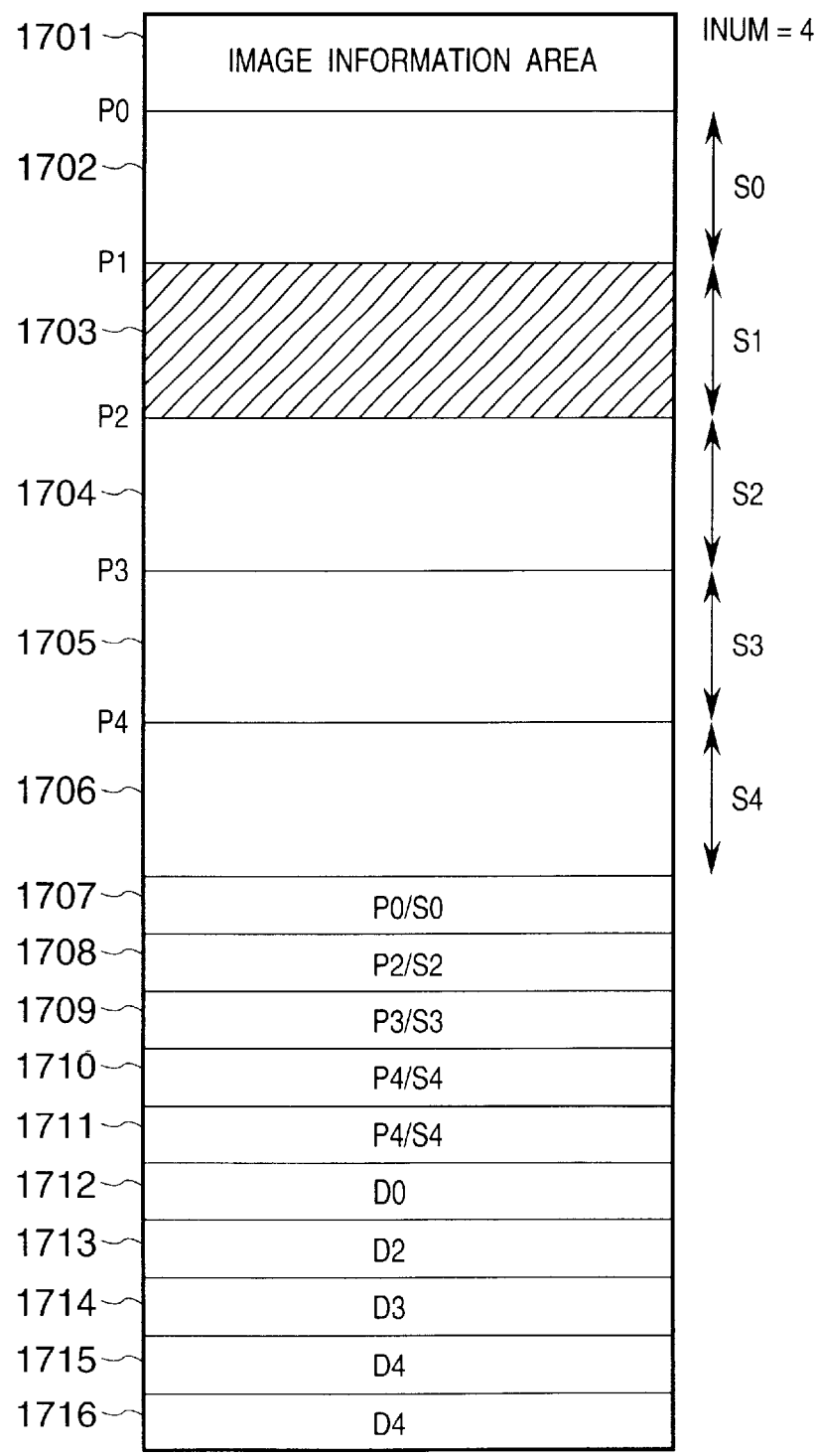
FIG. 33 is a view for explaining the state of the image file after image deletion in the eighth embodiment.

FIG. 33 is a view for explaining the state of the image file after deletion. In this example, the way the second image data is deleted is explained. In this case, the number of images (Images) in an area 1302 of an image information area 1701 is updated from 5 to 4. Reference numeral 1703 indicates the second image data to be deleted. As shown in FIG. 33, the image data 1703 still exists in the file even after deletion. In the size offset area indicated by 1707 to 1711, items indicating the start position P1 and the data amount S1 of the second image area are deleted, and the other data are shifted close together in order. However, the values of the start position P4 and the data amount S4 of the fifth image that are previously stored remain in 1711.

Likewise, in a feature data area indicated by 1712 to 1716, the feature D1 of the second image is deleted, and D0, D2, D3, and D4 are stored as they are shifted close together in order. The original value remains in 1716.

Figure 34:
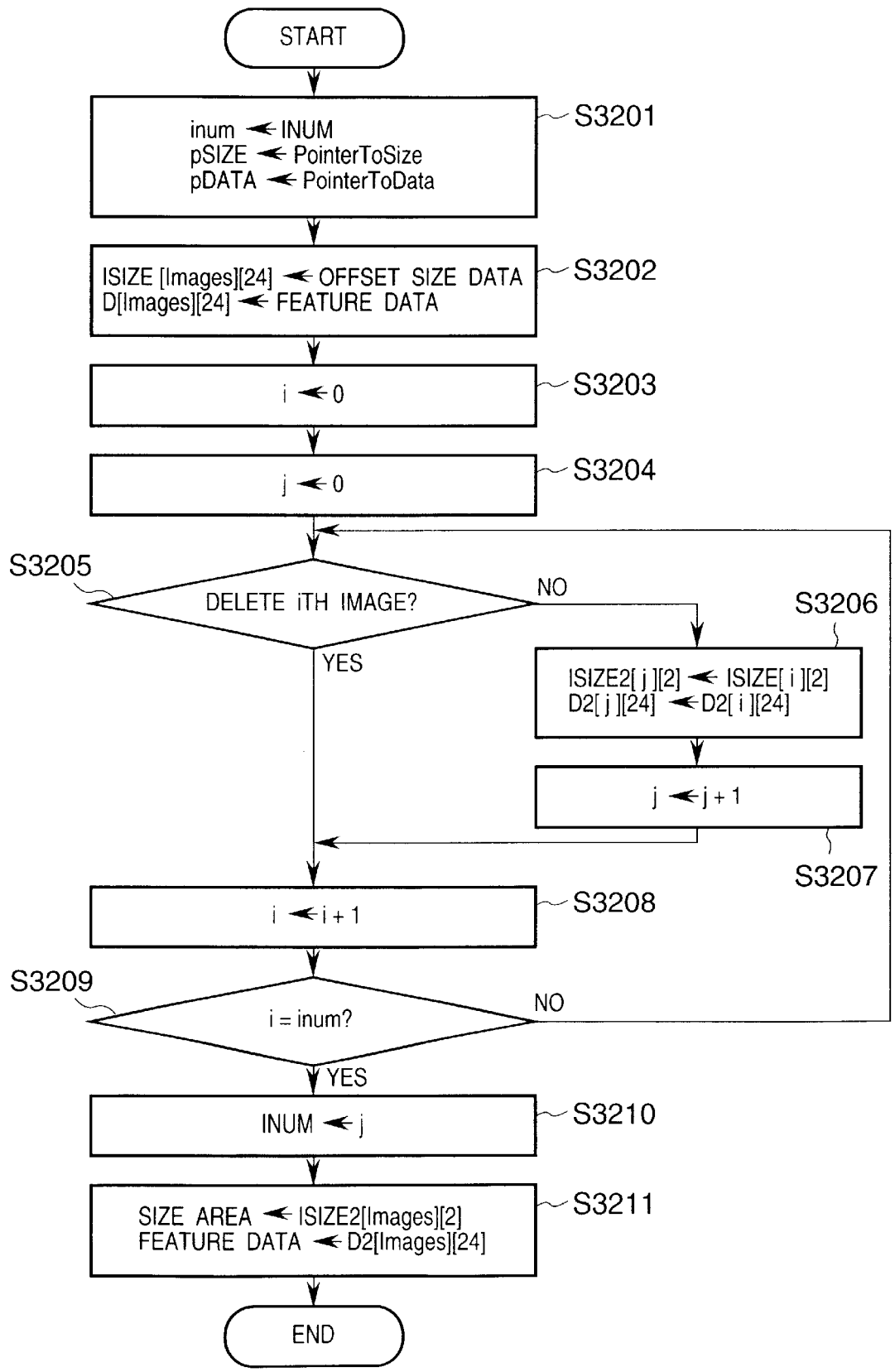
FIG. 34 is a flow chart for explaining a delete process in the eighth embodiment.

FIG. 34 is a flow chart for explaining the above delete process.

In step S3201, the number of images (Images) is read from the area 1302 of the image information area 1202 and set in a variable inum. Also, a pointer (PointerToSizeOFS) to the size offset area is read out from an area 1309 and set in a variable pSize. Furthermore, a pointer (PointerToData) to the feature data area is read out from an area 1310 and set in a variable pData.

In step S3202, on the basis of the position of psize obtained in step S3301, the contents of the size offset area are loaded into an array ISIZE[Images][2] formed on a memory (RAM 105). Also, on the basis of the position of pData, the contents of the feature data area are loaded into an array D[Images][24] formed on the memory (RAM 105).

In step S3203, a variable i is initialized by 0. In step S3204, a variable j is initialized by 0.

In step S3205, whether the ith image is a delete target is checked on the basis of the contents designated by the operator from a keyboard 102 or a mouse 102a. A method of selecting a delete target is not limited. If the ith image is found to be a delete target in step S3205, the flow advances to step S3208; if not, the flow advances to step S3206.

In step S3206, the contents of ISIZE[i][2] are copied to ISIZE2[j][2], and the contents of D[i][24] are copied to D2[j][24]. In step S3207, the variable j is incremented by 1. In step S3208, the variable i is incremented by 1.

In step S3209, the values of the variables i and inum are compared. If the two variables are equal, the flow advances to step S3210; if not, the flow returns to step S3205. In step S3210, the value of the variable j is written as the number of images (Images) in the area 1302 of the image information area 1201. In step S3211, the contents of ISIZE2 [Images][2] are written in the size offset area 1203, and the contents of the feature data D2[Images][24] are written in the feature data area 1204. Note that the contents (PointerToSizeOFS and PointerToData) of the areas 1309 and 1310 remain unchanged, so data of i–j images in each area remain (the areas 1711 and 1716 in FIG. 33).

In the eighth embodiment as described above, a single file contains header information describing information necessary to read out and display images, a feature data area continuously storing features of all images, and an image data area continuously storing all images. This realizes high-speed access to image data and simple management of the image data. Also, a size offset area for continuously storing the start position and data amount of each image is formed in an image file having a plurality of images. This allows rapid acquisition of the storage position of an image to be acquired. Consequently, the speed of access to an image file further increases. Furthermore, in an image file having a plurality of images, data in the size offset area indicative of the data amount of each image and data in the feature area indicative of each feature are deleted. Since, therefore, the same function as deleting image data is accomplished without deleting the body of image data, the speed of the delete process increases.

<Ninth Embodiment>

In the eighth embodiment, the data format shown in FIG. 23 is used as the size offset area 1203. As shown in FIG. 23, this size offset area 1203 stores both the start position and data amount of each image data. However, only one of the start position and data amount can also be stored as described in the sixth and seventh embodiments. In the ninth embodiment, as shown in FIG. 30, only the data amount of each image is stored in the area 1203.

Figure 35:
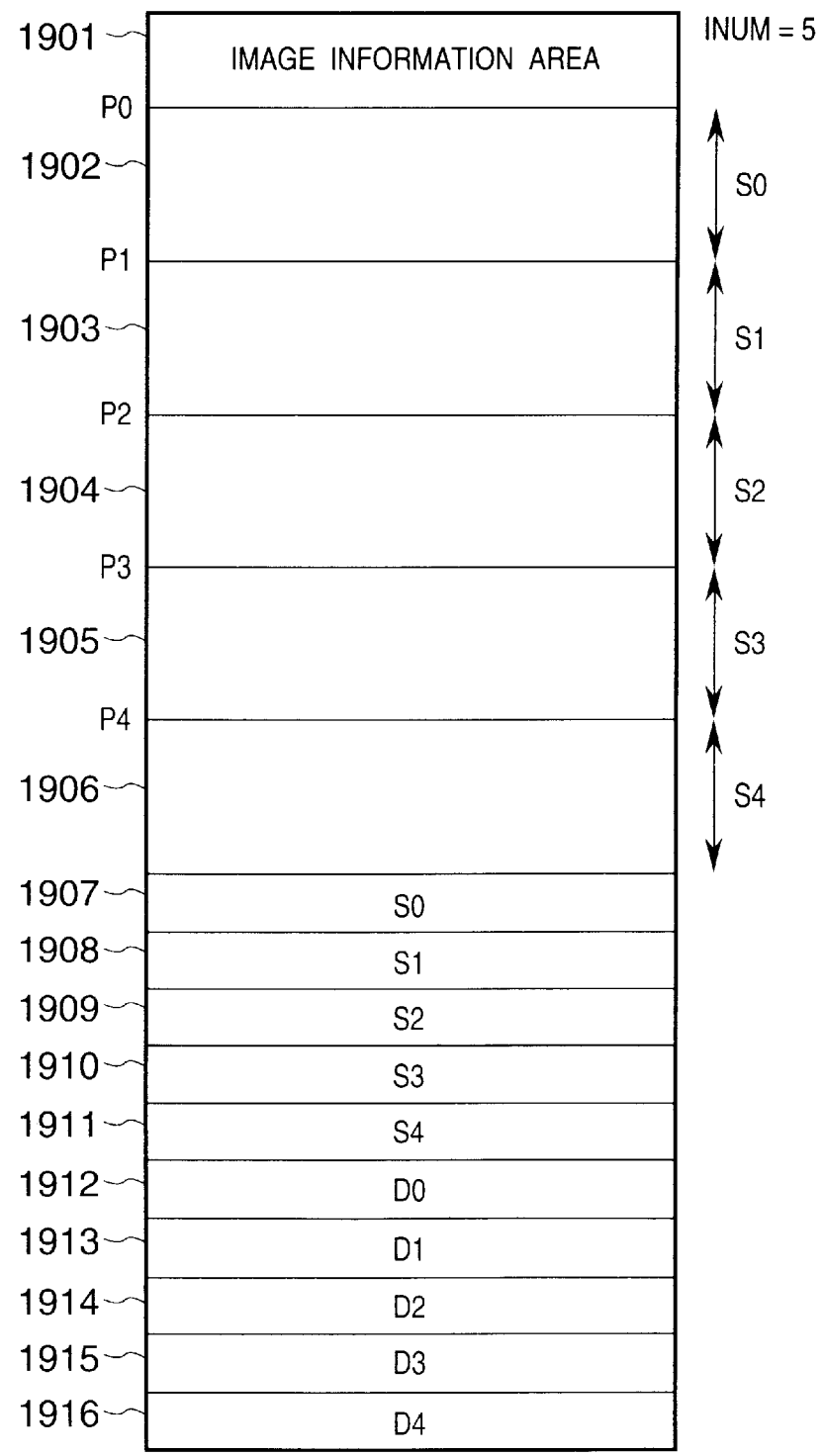
FIG. 35 is a view showing the state of an image file before image deletion in the ninth embodiment.

FIG. 35 is a view showing the state of an image file before deletion in the ninth embodiment. In FIG. 35, reference numeral 1901 denotes an area equivalent to an image information area 1201; 1902 to 1906, image data stored in an image data area 1202; 1907 to 1911, areas corresponding to a size offset area 1203; S0 to S4, the data amounts of the image data 1902 to 1906, respectively; 1912 to 1916, areas corresponding to an image feature data area 1204; and D0 to D4, the feature data of the image data 1902 to 1906, respectively.

Figure 36:
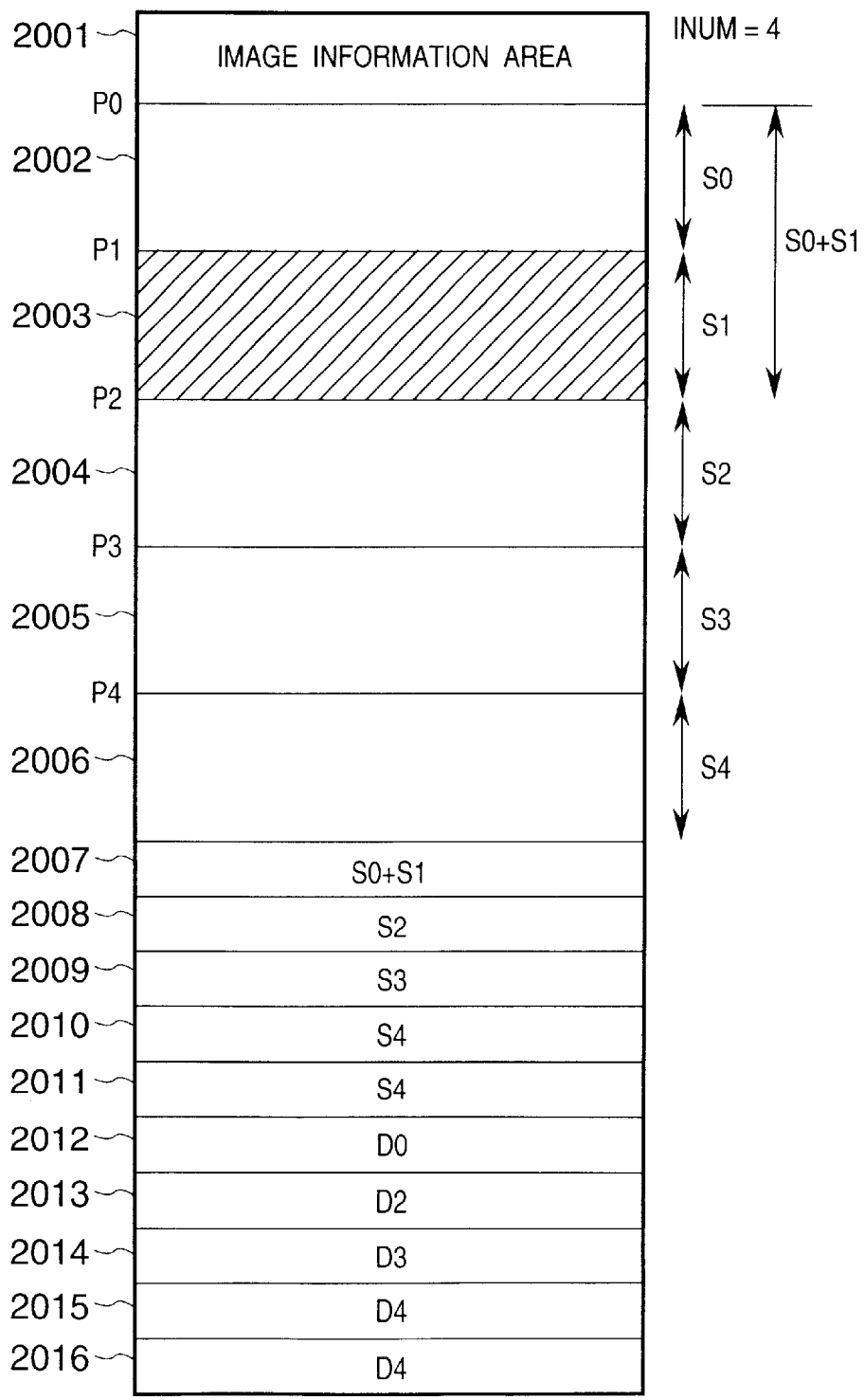
FIG. 36 is a view for explaining the state of the image file after image deletion in the ninth embodiment.

FIG. 36 is a view for explaining the state of the image file after deletion in the ninth embodiment. In this example, the way the second image data is deleted is explained. Reference numeral 2003 denotes the second image data. As shown in FIG. 36, this image data 2003 still exists in the file even after deletion. In size offset areas 2007 to 2011, an item indicating the data amount S1 of the second image area is deleted, and the other data are shifted close together in order. The value of the data amount S4 of the fifth image originally stored remains in 2011. However, to correctly indicate the position of the third image data, the data size in 2007 is the sum of the size S0 of the first image data and the size S1 of the deleted second image data.

Similarly, in feature data areas 2012 to 2016, the feature D1 of the second image is deleted, and D0, D2, D3, and D4 are stored as they are shifted close together in order. The original value remains in 2016.

Figure 37:
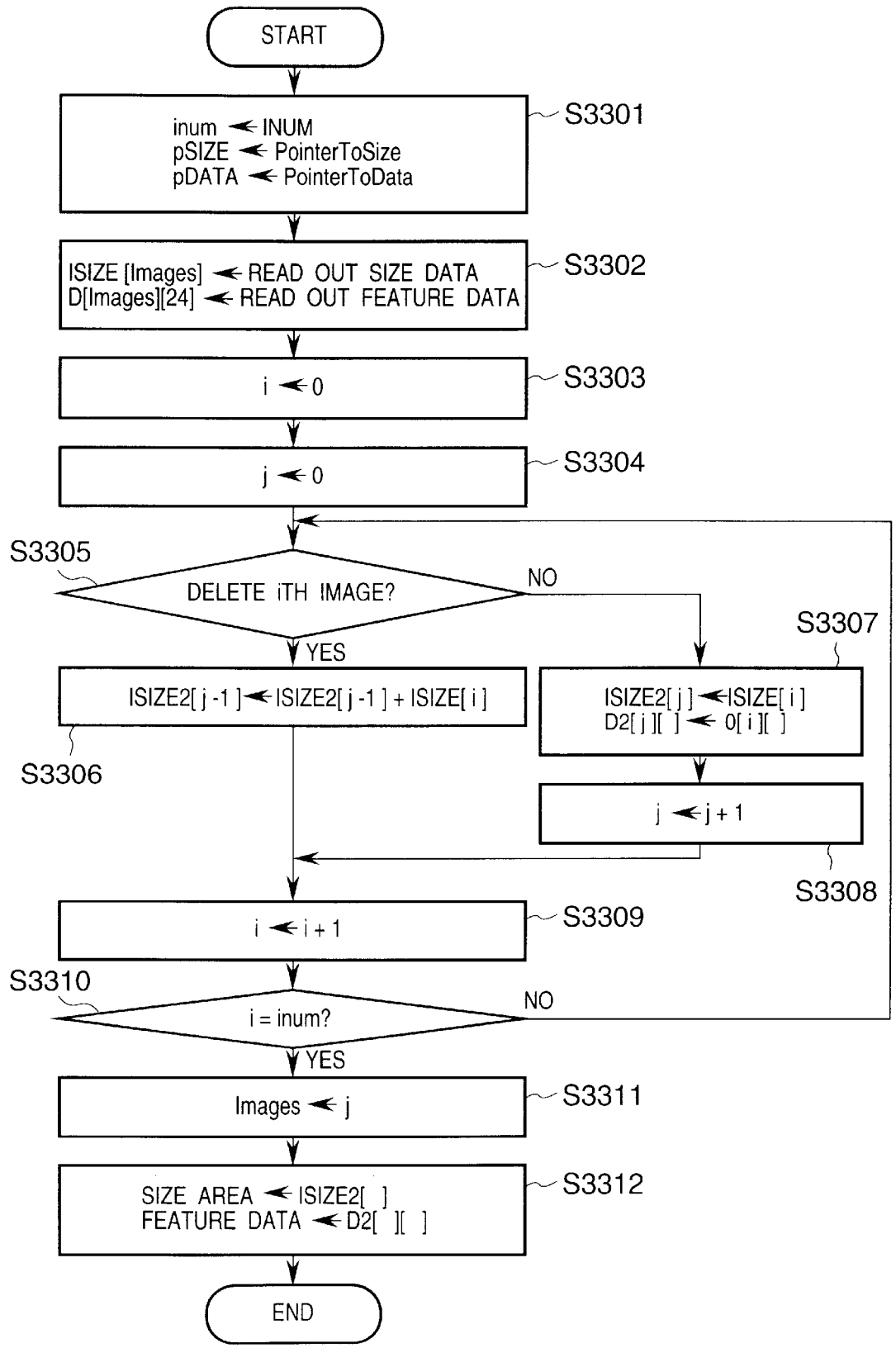
FIG. 37 is a flow chart for explaining an image data delete process in the ninth embodiment.

FIG. 37 is a flow chart for explaining the image data delete process according to the ninth embodiment.

In step S3301, the number of images (Images) is read out from an area 1302 of the image information area 1202 and set in a variable inum. Also, a pointer (PointerToSizeOFS) to the size offset area is read out from an area 1309 and set in a variable pSize. Furthermore, a pointer (PointerToData) to the feature data area is read out from an area 1310 and set in a variable pData.

In step S3302, on the basis of the position of pSize obtained in step S3301, the whole contents (in this embodiment, only the size of each image data is recorded) of the size offset area 1203 are stored in an array ISIZE [Images] on a memory (RAM 105). Likewise, on the basis of the position of pData, the whole contents of the feature data area 1204 are stored in an array D[Images][24] on the memory (RAM 105).

In step S3303, a variable i is initialized by 0. In step S3304, a variable j is initialized by 0.

In step S3305, whether the ith image is a delete target is checked on the basis of the contents designated by the operator from a keyboard 102 or mouse 102a. A method of selecting a delete target is not limited. If the ith image is found to be a delete target in step S3305, the flow advances to step S3306; if not, the flow advances to step S3307.

If the ith image is a delete target, in step S3306 the contents of already processed ISIZE2[j–1] are changed to "ISIZE2[j–1]+ISIZE[i]".

If the ith image is not a delete target, the flow advances to step S3307 to copy the contents of ISIZE[i] to ISIZE2[j] and the contents of D[i][24] to D2[j][24].

In step S3308, the variable j is incremented by 1. In step S3309, the variable i is incremented by 1. In step S3310, the values of the variables i and inum are compared. If the two variables are equal, the flow advances to step S3311; if not, the flow returns to step S3305.

In step S3311, the value of the variable j is written as the number of images (Images) in the area 1302 of the image information area 1201. In step S3312, the contents of ISIZE2[Images] are written in the size offset area 1203, and the contents of the feature data D2[Images][24] are written in the feature data area 1204. When the first image data 1902 is to be deleted as a special case, the start position of the image data area is changed to the start position of the second image data 1903.

<10th Embodiment>

In the above ninth embodiment, only the size of each image data is registered in the size offset area 1203. In the 10th embodiment, only the offset amount of each image data is registered in the size offset area 1203.

Figure 38:
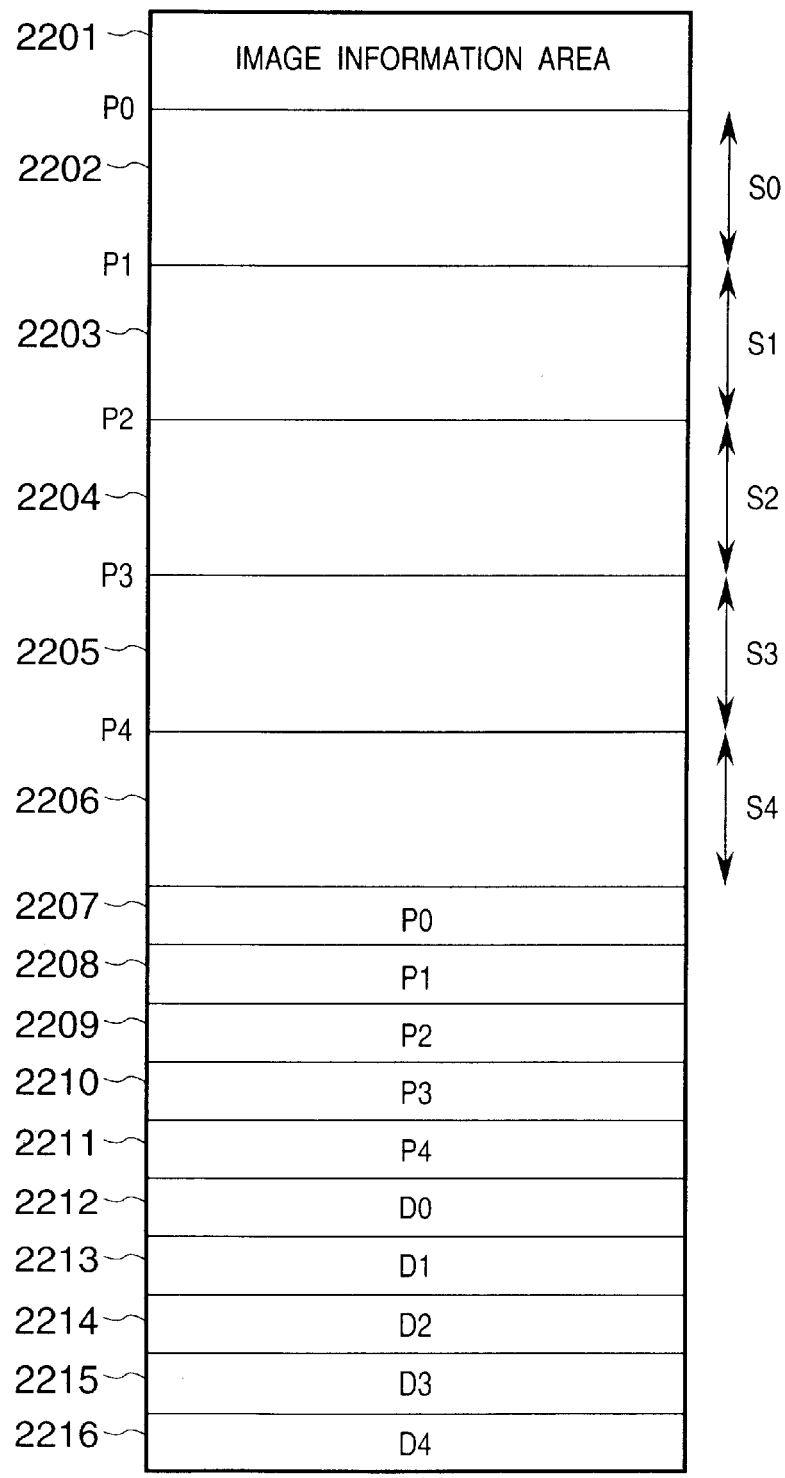
FIG. 38 is a view showing the state of an image file before image deletion in the 10th embodiment.

FIG. 38 is a view showing the state of an image file before deletion in the 10th embodiment. In FIG. 38, reference numeral 2201 denotes an area equivalent to an image information area 1201; 2202 to 2206, image data stored in an image data area 1202; 2207 to 2211, areas corresponding to a size offset area 1203; P0 to P4, the offset amounts of the image data 2202 to 2206, respectively; 2212 to 2216, areas equivalent to an image feature data area 1204; and D0 to D4, feature data of the image data 2202 to 2206, respectively.

Figure 39:
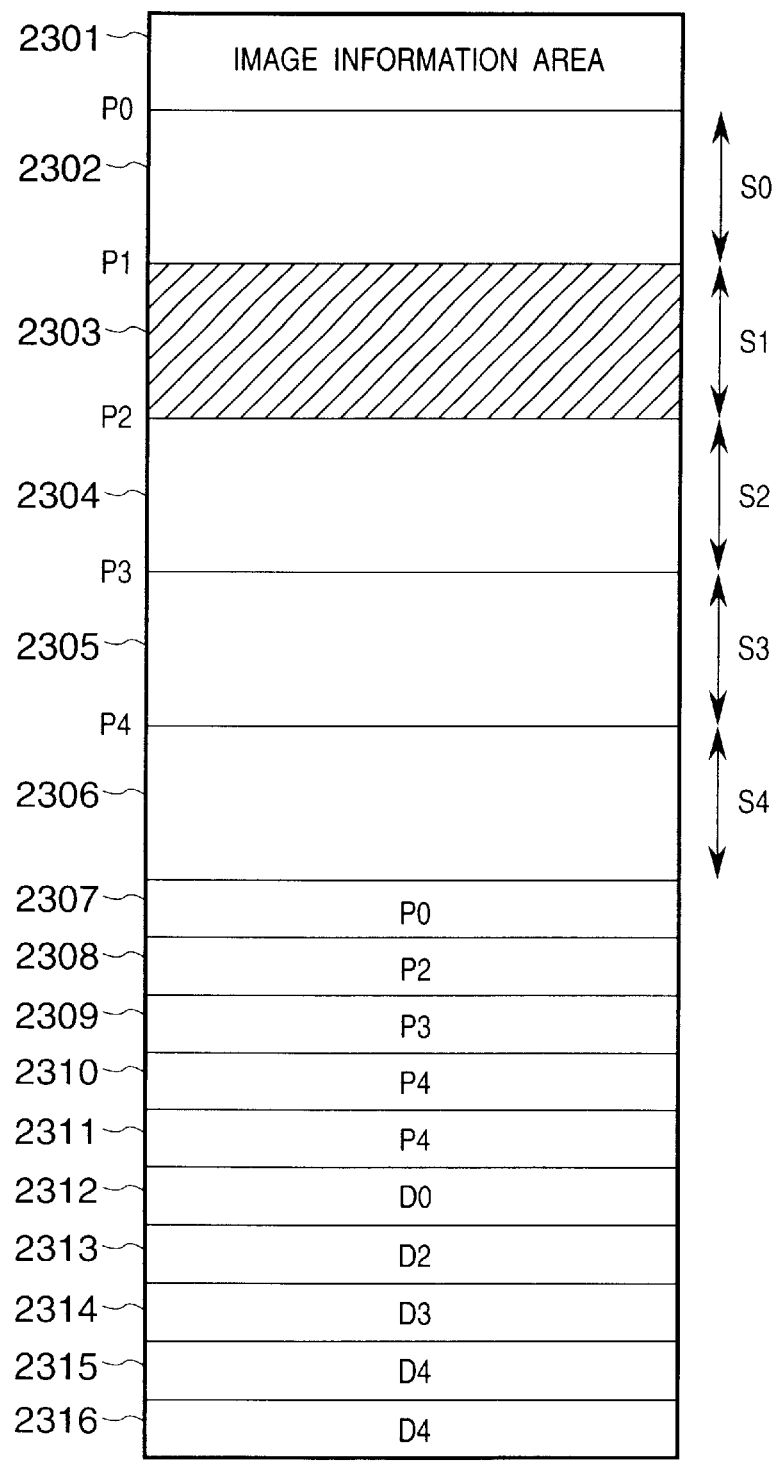
FIG. 39 is a view for explaining the state of the image file after image deletion in the 10th embodiment.

FIG. 39 is a view for explaining the state of the image file after deletion in the 10th embodiment. In this example, the way the second image data is deleted is explained. Reference numeral 2303 denotes the second image data. As shown in FIG. 39, this image data 2303 still exists in the file even after deletion. In size offset areas 2307 to 2311, an item indicating the offset amount P1 of the second image area is deleted, and the other data are shifted close together in order. The value of the offset amount P4 of the fifth image that is originally stored remains in 2311.

Similarly, in feature data areas 2312 to 2316, the feature D1 of the second image is deleted, and D0, D2, D3, and D4 are stored as they are shifted close together in order. The original value (D4) remains in 2316.

The image data delete process according to the 10th embodiment is almost identical with that of the eighth embodiment (FIG. 34) except that in step S3206, the contents of ISIZE[i] are stored in an offset amount ISIZE2[j], and no data amount is processed.

In the image data delete process of each of the above embodiments, the sizes of the feature data area and the size offset area before and after image data deletion are the same, so the value of PointerToSizeOFS or PointerToData need not be changed. However, in accordance with the number of image data to be deleted, the value of PointerToData may be changed and the size of the size offset area or the feature data area may be reduced. For example, when one image data in the area 1703 is deleted from the state shown in FIG. 32, the start position of the area 1711 is set as PointerToData in FIG. 33, the feature data are started to be stored from the position of the area 1711, and the area of the last feature data is deleted. In this manner, it is possible to delete the data in the areas 1611 and 1616 in FIG. 32, store the data as they are shifted close together in order, and reduce the size of the image file.

As described above, the eighth to 10th embodiments allow high-speed access to image data and simple management of the image data and can also delete image data from an image database at high speed.

<11th Embodiment>

In the above eighth to 10th embodiments, desired image data existing in an image file can be invalidated. However, in this state, the body of the image data remains in the image file; the image file size cannot be decreased by deleting image data in the image file.

Figure 40:
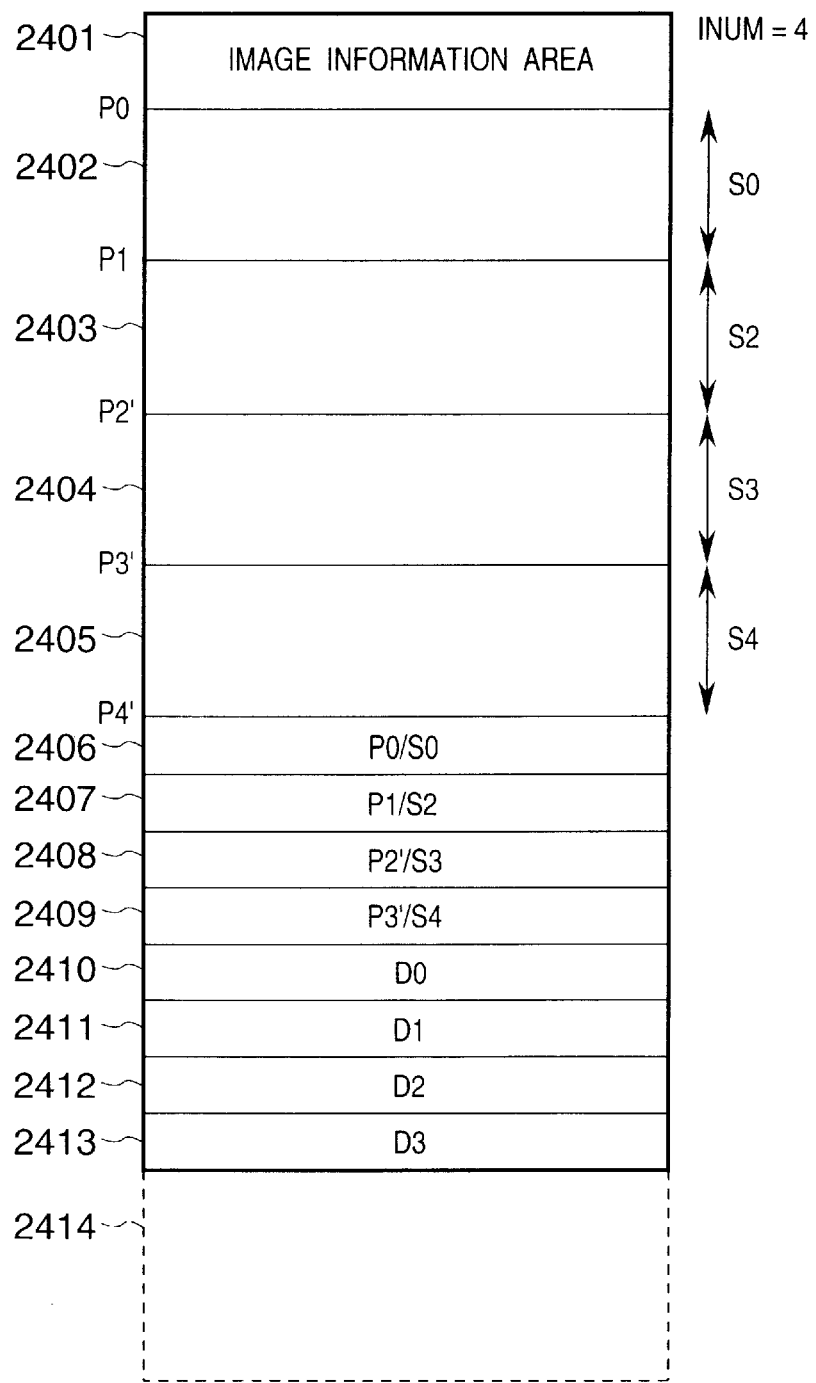
FIG. 40 is a view showing an image file, in which invalid data is deleted from the image file state shown in FIG. 33, in the 11th embodiment.

FIG. 40 is a view showing an image file from which invalid data is deleted from the state of an image file shown in FIG. 33. The invalid image data 1703 in FIG. 33 is deleted, and the other data are shifted close together accordingly to thereby construct the file. Therefore, although the first image data has a start position P0 and a size S0 as in FIG. 33, the second image has a start position P1 and a size S2 in FIG. 40, while this image has the start position P1 and the size S1 in FIG. 33. This is so because the third image 1704 in FIG. 33 is shifted to this position. The third and fourth images have start positions P2' and p3', respectively, although their data amounts are still S3 and S4, respectively.

Figure 41:
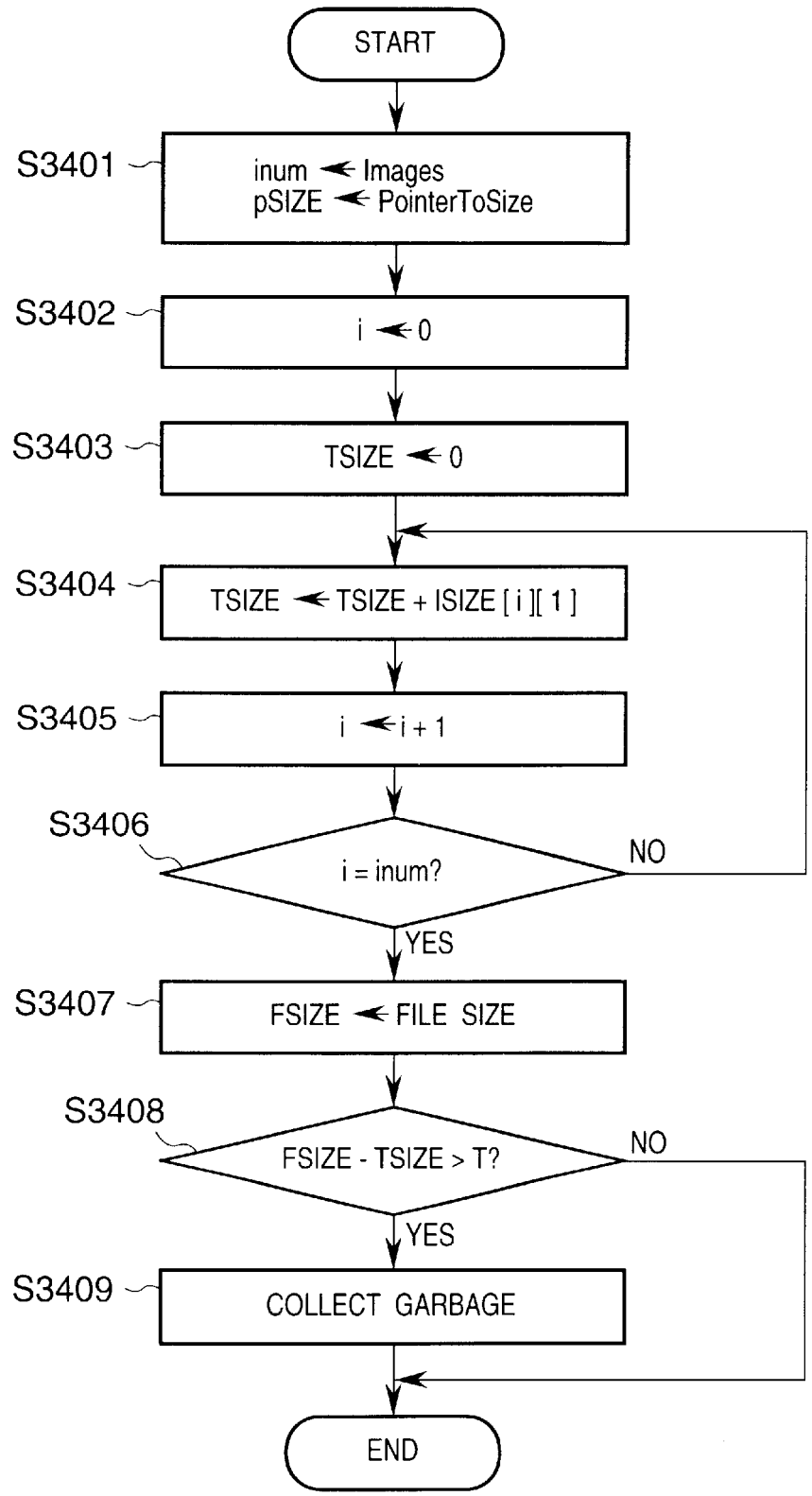
FIG. 41 is a flow chart for explaining a file reduction process for an image file including an invalid area according to the 11th embodiment.

FIG. 41 is a flow chart for explaining a process of reducing an image file containing an invalid area. In this process, the total amount of valid data is calculated from an image size offset area and compared with the value of the whole file, thereby determining whether the file reduction process is necessary.

First, in step S3401, the number of images (Images) is read out from an area 1302 of an image information area 1202 and stored in a variable inum on a memory, and a pointer (PointerToSize) to a size offset area is read out from an area 1309 and stored in a variable pSize. In step S3402, a variable i is initialized by 0. In step S3403, a variable TSIZE is initialized by 0. Note that this TSIZE is a variable indicative of the total sum of valid image data amounts.

In step S3404, the value of the ith size offset data is added to TSIZE. In this step S3404, ISIZE[i][1] represents size data of the ith size offset data (offset data is represented by ISIZE[i][0]).

In step S3405, a variable I is incremented by 1. In step S3406, the contents of the variables i and inum are compared. If the two variables are unequal, the flow returns to step S3404 to repeat the above processing. If the two variables are equal, the flow advances to step S3407.

In step S3407, the size of the whole current image file is input to a variable FSIZE. At this point, the image data size of all valid image data is stored in TSIZE. In step S3408, the difference between FSIZE and TSIZE is calculated. If the difference is larger than a preset threshold value T, the flow advances to step S3409; if not, the process is completed. If the difference between FSIZE and TSIZE is larger than the threshold value T, the flow advances to step S3409 to execute garbage collection.

Figure 42:
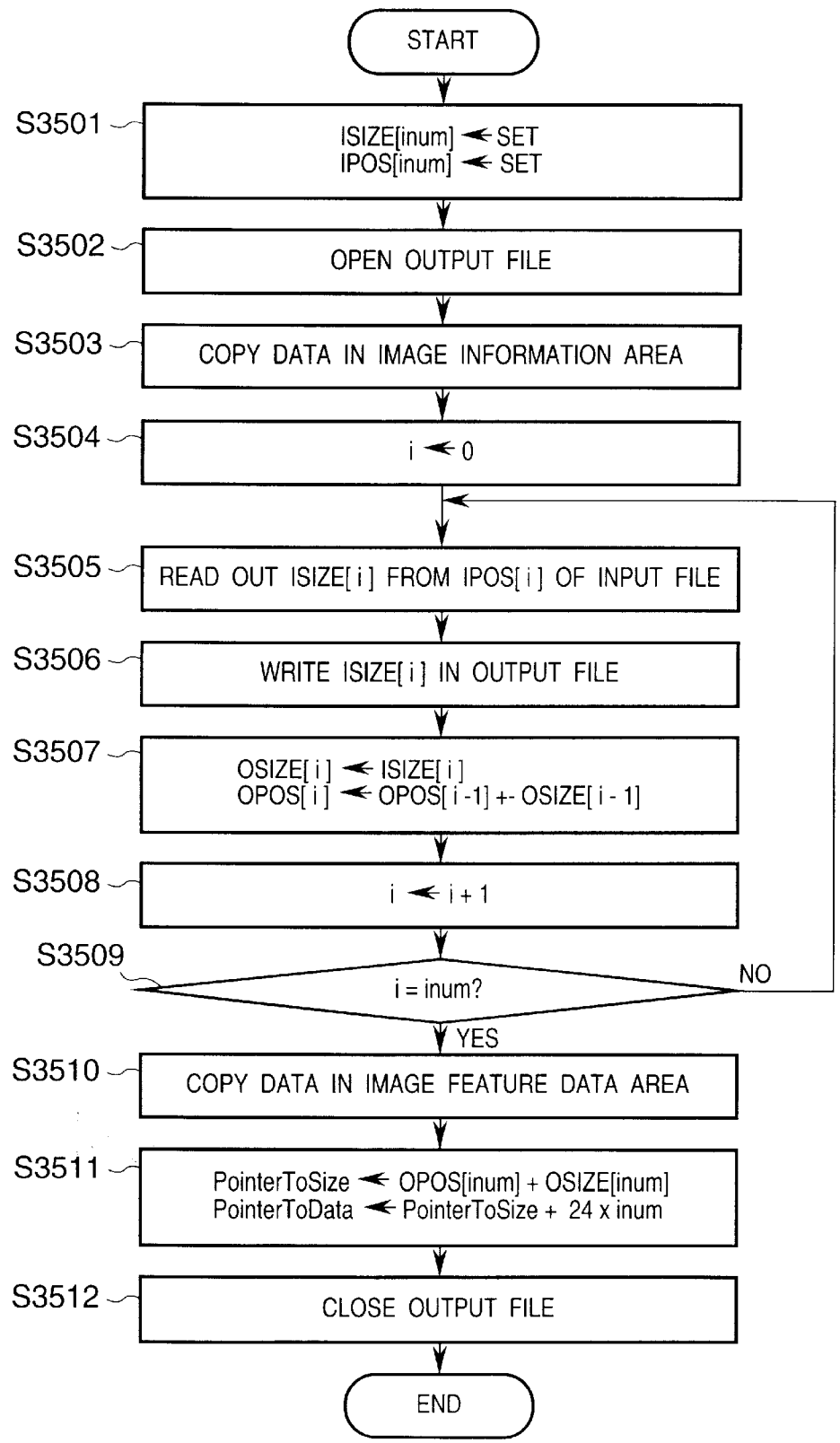
FIG. 42 is a flow chart for explaining a garbage collection process according to the 11th embodiment.

The processing contents in step S3409 will be described in detail below with reference to FIG. 42. FIG. 42 is a flow chart for explaining the garbage collection process according to this embodiment.

In step S3501, start position information stored in a size offset area 1203 is set in IPOS[Images], and data amount information is set in ISIZE[Images]. In step S3502, an output file (image file) is opened. In step S3503, an image information area 1201 is read-accessed from an input file, and the readout data is written in the output file. In step S3504, a variable i is initialized to 0.

In step S3505, from the leading position of the input file the data is read out from the position of IPOS[i] by the size of ISIZE[i]. In step S3506, the readout data is written in the current position of the output file by the size of ISIZE[i]. Consequently, the ith image data is entirely read out from the output file and written in the input file.

In step S3507, ISIZE[i] is copied to an ith element OSIZE[i] in an array OSIZE, and the sum of OPOS[i−1] and OSIZE[i−1] is substituted into an ith element OPOS[i] in the array OSIZE. In step S3508, the variable i is incremented by 1. In step S3509, this variable i is compared with a variable inum. If the two variables are equal, this means that all the valid image data in this input file are written in the output file, so the flow advances to step S3510. If the two variables are unequal, this means that unprocessed image data still exists in the input file. Hence, the flow returns to step S3505.

In step S3510, data in an image feature data area is read out from the input file and written in the output file. This image feature data to be written is the feature data of the number of images indicated by Images. As a consequence, the image feature data is stored subsequently to the size offset area of the valid image data stored by the processing up to step S3509.

In step S3511, the sum of OPOS[inum] and OSIZE[inum] is written as PointerToSize in the area 1309 of the image information area 1201 already formed in the input file in step S3503. Also, the sum of PointerToSize and 24×inum is substituted as PointerToData in the area 1310. After that, the output file is closed in step S3512.

In the 11th embodiment as described above, in step S3408 the amount of invalid images in an image file is checked. If the amount of invalid images exceeds a predetermined amount, the garbage collection process (S3409) is executed to delete the body of image data of the invalid images. This can optimize the actual image file size. In the above example, a portion denoted by 2414 in FIG. 40 is deleted from the file (FIG. 33) before the processing.

<12th Embodiment>

In the above 11th embodiment, the size offset area 1203 stores the size and position (offset) of each image data. In the 12th embodiment, a size offset area stores only the start position of each image.

An image file containing invalid image data according to the 12th embodiment is as shown in FIG. 39. When only image start positions P0, P2, P3, and P4 are stored in a size offset area 1203 as shown in FIG. 39, similar processing is possible by slightly changing step S3505 of the flow chart shown in FIG. 42.

That is, as shown in FIG. 5, one image data in an image data area starts with an SOI marker and ends with an EOI marker. Accordingly, in step S3505 one image data can be read out from an input file by reading from the position of IPOS[i] until the EOI marker is detected. It is obvious that, by setting this loaded data amount in ISIZE[i], the subsequent processing can be performed in the same manner as in the flow chart of FIG. 42.

In the 12th embodiment as described above, effects similar to those of the 11th embodiment can be obtained even when the size offset area of an image file contains only the start position of each image.

<13th Embodiment>

In the 12th embodiment, the size offset area 1203 stores the start position of each image data. In the 13th embodiment, this size offset area 1203 stores only the data amount of each image.

When only the sizes of individual image data are stored in the size offset area 1203, the storage position of each image data is acquired by accumulating the sizes of these image data stored. Therefore, when image data is deleted, some implementation is necessary in updating the image data size.

That is, in the process shown in FIG. 34, if in step S3205 image data is found to be deleted, the size of this image data to be deleted is added to the size of the immediately preceding image data, thereby updating the size of this immediately preceding image data.

An image file containing invalid image data according to the 13th embodiment is as shown in FIG. 36. When the second image data is deleted as shown in FIG. 36, a size S1 of this image data to be deleted is added to a size S0 of the immediately preceding image data (first image data) in the size offset area 1203.

When only image data sizes S0+S1, S2, S3, and S4 are present in the size offset area 1203 as shown in FIG. 36, file reduction can be performed by slightly changing steps S3505 to S3507 in the flow chart of the garbage collection process shown in FIG. 42.

That is, when image data is to be read out from an input file in step S3505 and written in an output file in step S3506, the data is loaded by the amount of ISIZE[i] from the start position of the image data area. In the example shown in FIG. 36, not only the first image (size S0) but also the invalid image data (size S1) immediately after the first image is loaded. As shown in FIG. 5, data in the image data area starts with an SOI marker and ends with an EOI marker. Therefore, when the image data read out in step S3505 is written in the output file in step S3506, the first image can be written by writing the loaded data from the leading position until the EOI marker is detected. This write size is set in OSIZE[i].

In the 13th embodiment as described above, effects similar to those of the 12th embodiment can be obtained even when only information of the data amount of each image is present in the size offset area of an image file.

The 11th to 13th embodiments as described above allow high-speed access to image and simple management of the image data and can also delete image data from an image database at high speed.

Also, since the body of image data to be deleted can be erased, the data size of an image database can be reduced.

<14th Embodiment>

In the eighth embodiment described earlier, desired image data existing in an image file can be invalidated as shown in FIG. 33. In the following embodiment, a process (to be referred to as a reconstruction process hereinafter) of making (restoring) deleted image data valid again when, for example, the above invalidation process is executed by mistake will be described. As described previously, in the delete process of the eighth embodiment, the body of image data is not deleted; only information in the size offset area and information in the feature data area are deleted. Accordingly, it is only necessary to restore these pieces of information.

FIG. 33 described above illustrates the way the second image data is deleted. In this case, the total number of images (Images) indicated by an image information area 1201 is 4. In effect, however, five image data 1702 to 1706 are stored in an image data area 1202. That is, 1703 denotes the second image data to be deleted, and this image data 1703 still exists in the file even after deletion. Accordingly, this processing is more like invalidation than deletion. Hence, the reconstruction process shown in FIG. 43 can also be said to make invalidated image data valid.

Figure 43:
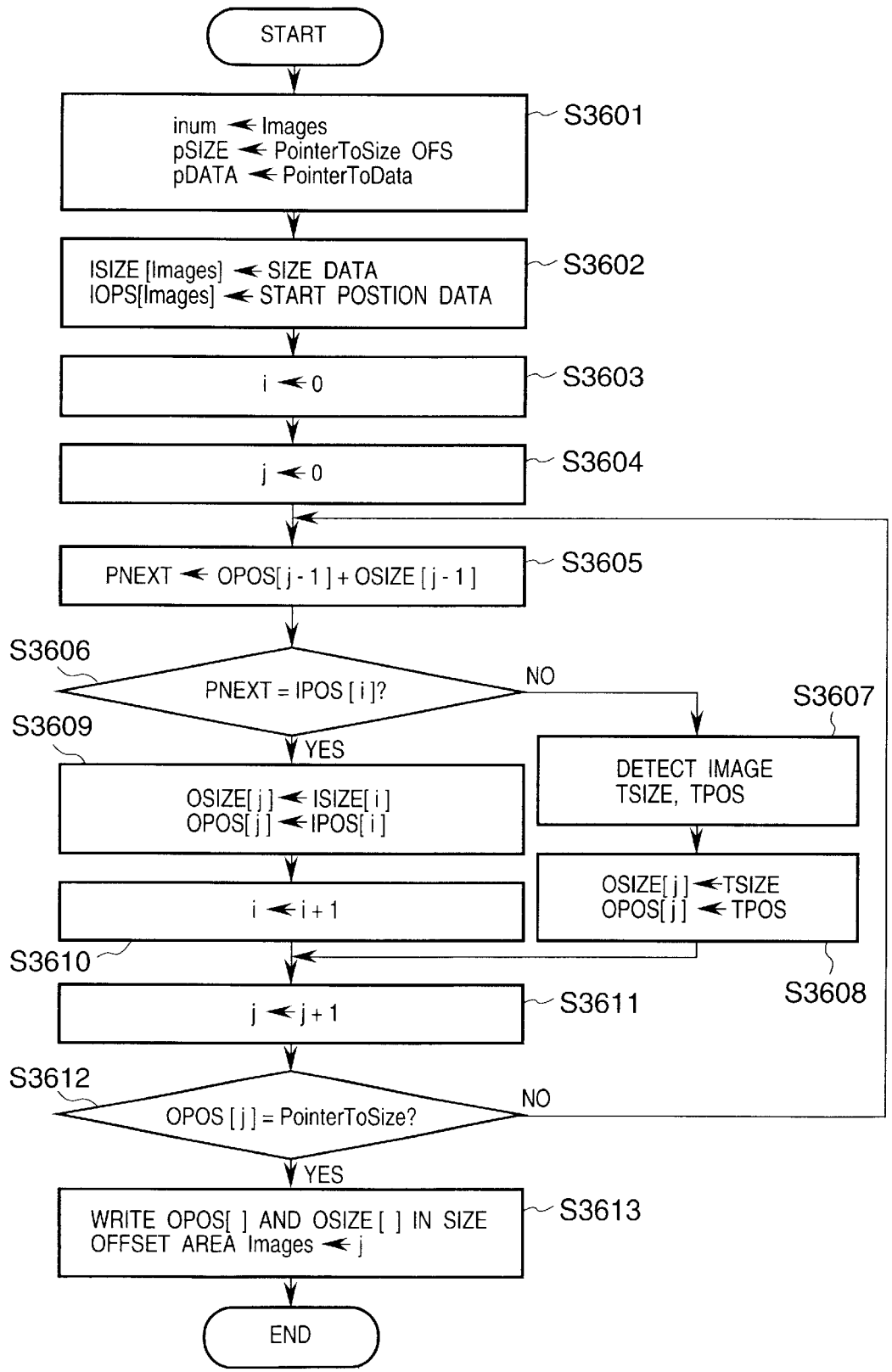
FIG. 43 is a flow chart showing the flow of an invalid image reconstruction process according to the 13th embodiment.

FIG. 43 is a flow chart showing the flow of the invalid image reconstruction process according to the 14th embodiment. In this reconstruction process, from the offset position and size information of each image in a size offset area the start position of the next image is calculated. If the start position of the next image thus calculated is equal to the start position information of the next image indicated by the offset position stored in the size offset area,. images are closely arranged with no space between them. On the other hand, if the calculated start position is different from the start position indicated by the offset information in the size offset area, at least one invalid image data exists between the two images.

For example, from offset information P3 and a size S3 stored in an area 1709 shown in FIG. 33, the start position of the next image is calculated. This start position is equal to the start position indicated by offset information P4 stored in an area 1710, so no invalid data exists between the two adjacent images. On the other hand, from offset information P0 and a size S0 in an area 1707, the start position of the next image is found to be P1 in FIG. 33. Since the offset information of the next image is P2 stored in an area 1708, this information is inconsistent with the calculated start position. Accordingly, it is determined that invalidated image data exists between the two adjacent images.

This invalid image data area is scanned, and, if the data is found to be JPEG data, one invalid image data can be extracted by detecting an EOI marker code. The invalid image data can be reconstructed by reregistering the data amount of the image. This process will be described in more detail below with reference to the flow chart in FIG. 43.

In step S3601, the values of an area 1302 (Images), an area 1309 (PointerToSize), and an area 1310 (PointerToData) are substituted into variables inum, pSize, and pData, respectively. In step S3602, size data of the size offset area is loaded into an array ISIZE. Also, offset data in the size offset area is loaded into an array IPOS. In step S3603, a variable i is initialized by 0. In step S3604, a variable j is initialized by 0.

In step S3605, the sum of array elements OPOS[j−1] and OSIZE[j−1] is substituted into a variable PNEXT. In this processing, the value of PointerToTile is set in OPOS[−1], and 0 is set in OSIZE[−1]. In step S3606, the variable PNEXT and IPOS[i] are compared. If the two values are equal, the calculated start position and the start position indicated by the offset information are equal. Therefore, it is determined that no invalidated image exists, and the flow advances to step S3609. On the other hand, if the two values are unequal, the calculated start position and the start position indicated by the offset information are unequal. Hence, it is determined that invalidated image data exists, and the flow advances to step S3607.

In step S3607, an EOI marker is detected from the structure of image data explained in FIG. 5, the detected position is substituted into a variable TPOS, and the data amount of the loaded image data is substituted into a variable TSIZE. In step S3608, the contents of the variables TSIZE and TPOS are substituted into array elements OSIZE [j] and OPOS[j], respectively. In this manner, the offset position and size of the invalidated image data are restored in the offset size area.

On the other hand, if it is determined that no invalidated data exists, the flow advances to step S3609, and the contents of the array elements ISIZE[i] and IPOS[i] are substituted into the array elements OSIZE[j] and OPOS[j], respectively.

In step S3610, the variable i is incremented by 1. In step S3611, the variable j is incremented by 1. In step S3612, OPOS[j] and PointerToSize are compared. If the two values are equal, the flow advances to step S3613, OPOS[0] to OPOS[j] and OSIZE[0] to OSIZE[j] are written in the size offset area, "Images" is updated by the content of the variable j, and this processing is completed. If the condition in step S3612 is not met, the flow returns to step S3605 to repeat the above processing.

As described above, invalid data can be registered by the means of scanning invalid image data in an image file.

The restored image data must be subjected to the aforementioned feature calculations and inserted into a proper position in a feature data area 1204. That is, the feature calculation process explained in step S2804 of FIG. 26 is performed for the restored image data, and the obtained feature data (arrays D[i][0] to D[i][23]) is inserted into a position, in the feature data area 1204, which corresponds to the restored image data.

In the above embodiment, a size offset area stores offset information indicating the start position of each image and size information indicating the size of the image. By using these pieces of information, the presence of an invalidated image is detected as in steps S3605 and S3606. However, the present invention is evidently applicable to the case where only offset information indicative of the start position of each image is stored in the size offset area 1203 or the case where only size information of each image is stored.

For example, when only offset information is stored in the size offset area 1203, the size of each image can be obtained from the interval between offset positions. However, if deletion is performed as shown in FIG. 33, P2 is recorded next to the offset position P0. Therefore, instead of the processes in steps S3605 and S3606, the presence of an invalidated image can be known on the basis of SOI and EOI detected by scanning the image data area to a position indicated by the next offset information. For example, when an area from the offset position P0 to the offset position P2 is scanned, SOI and EOI appear at the offset position P1 during the scan. This shows the presence of an invalidated image.

On the other hand, when only size information is stored in the offset size area, the offset position of each image can be obtained by accumulating the sizes of individual images. If deletion is performed as shown in FIG. 33, however, the size information in the area 1707 must be changed to S0+S1 so that the position P2 of the next image is correctly obtained. Accordingly, instead of the processes shown in steps S3605 and S3606, the presence of an invalidated image is known on the basis of SOI and EOI detected by scanning the image data area over the whose size of the corresponding image from a position obtained by size information accumulation. For example, in the case of FIG. 33, an image data area of a size of S0+S1 is scanned from the position of P0. In this case, SOI and EOI appear at the offset position P1 (from the position P0 to the position of the size S0) during the scan. This indicates the presence of an invalidated image.

In the 14th embodiment as described above, even a once deleted image can be restored when the image is again required.

The present invention can be applied to a system constituted by a plurality of devices (e.g., a host computer, interface, reader, and printer) or to an apparatus (e.g., a copying machine or facsimile) comprising a single device.

Further, the object of the present invention can also be achieved by providing a storage medium storing program codes of software for performing the aforesaid functions according to the embodiments to a system or an apparatus, reading the program codes with a computer (or a CPU or MPU) of the system or apparatus from the storage medium, and then executing the program.

In this case, the program codes read from the storage medium realize the functions according to the embodiments, and the storage medium storing the program codes constitutes the invention.

Further, as the storage medium for providing the program codes, it is possible to use, e.g., a floppy disk, hard disk, optical disk, magnetooptical disk, CD-ROM, CD-R, magnetic tape, nonvolatile memory card, and ROM.

Furthermore, besides aforesaid functions according to the above embodiments are realized by executing the program codes which are read by a computer, the present invention includes a case where an OS (Operating System) or the like working on the computer performs a part or the whole of actual processing in accordance with designations by the program codes and realizes functions according to the above embodiments.

Furthermore, the present invention also includes a case where, after the program codes read from the storage medium are written in a function extension board which is inserted into the computer or in a memory provided in a function extension unit which is connected to the computer, a CPU or the like contained in the function extension board or unit performs a part or the whole of actual processing in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image storage method of storing a plurality of images and a feature of each of the plurality of images, comprising:

a first writing step, of writing attribute information necessary to read out and display an image into an attribute information area formed in an image file;

a second writing step, of forming a feature data area in said image file and continuously storing features of the plurality of images in said feature data area; and a third writing step, of forming an image data area in said image file and continuously storing image data of the plurality of images in the image data area.

2. The method according to claim 1, wherein the image file stores data in the order of the attribute information area, the feature data area, and the image data area.

3. The method according to claim 1, wherein the image file stores data in the order of the feature data area, the attribute information area, and the image data area.

4. The method according to claim 1, wherein the image file stores data in the order of the image data area, the attribute information area, and the feature data area.

5. The method according to claim 1, wherein the image file stores data in the order of the feature data area, the image data area, and the attribute information area.

6. The method according to claim 1, wherein the image file stores data in the order of the image data area, the feature data area, and the attribute information area.

7. The method according to claim 1, wherein the attribute information stored in the attribute information area contains at least one of information indicating a version of a method of storing image data in the image file, information indicating the number of images, information indicating a size of an image, information indicating an image compression method, and information indicating a method of calculating an image feature stored in the feature data area.

8. The method according to claim 1, wherein the feature is a value calculated from pixel values contained in each segmented area when an image is segmented into N parts.

9. The method according to claim 1, wherein the feature data area stores the same number of feature data for each of the plurality of images.

10. The method according to claim 1, wherein the image data area stores a compressed image obtained by compressing each image by a predetermined method.

11. The method according to claim 1, wherein the image data area stores an uncompressed image of each image.

12. An image storage apparatus for storing a plurality of images and a feature of each of the plurality of images, comprising:

first writing means for writing attribute information necessary to read out and display an image into an attribute information area formed in an image file;

second writing means for forming a feature data area in said image file and continuously storing features of the plurality of images in said feature data area; and third writing means for forming an image data area in said image file and continuously storing image data of the plurality of images.

13. The apparatus according to claim 12, wherein said image file stores data in the order of said attribute information area, said feature data area, and said image data area.

14. The apparatus according to claim 12, wherein said image file stores data in the order of said feature data area, said attribute information area, and said image data area.

15. The apparatus according to claim 12, wherein said image file stores data in the order of said image data area, said attribute information area, and said feature data area.

16. The apparatus according to claim 12, wherein said image file stores data in the order of said feature data area, said image data area, and said attribute information area.

17. The apparatus according to claim 12, wherein said image file stores data in the order of said image data area, said feature data area, and said attribute information area.

18. The apparatus according to claim 12, wherein the attribute information stored in said attribute information area contains at least one of information indicating a version of a method of storing image data in said image file, information indicating the number of images, information indicating a size of an image, information indicating an image compression method, and information indicating a method of calculating an image feature stored in said feature data area.

19. The apparatus according to claim 12, wherein the feature is a value calculated from pixel values contained in each segmented area when an image is segmented into N parts.

20. The apparatus according to claim 12, wherein said feature data area stores the same number of feature data for each of the plurality of images.

21. The apparatus according to claim 12, wherein said image data area stores a compressed image obtained by compressing each image data by a predetermined method.

22. The apparatus according to claim 12, wherein said image data area stores an uncompressed image of each image data.

23. A storage medium storing a control program for allowing a computer to realize a process of storing a plurality of images and a feature of each of the plurality of images, said control program comprising:

a code of a first writing step, of writing attribute information necessary to read out and display an image into an attribute information area formed in an image file;

a code of a second writing step, of forming a feature data area in said image file and continuously storing features of the plurality of images in the feature data area; and a code of a third writing step, of forming an image data area in said image file and continuously storing image data of the plurality of images in the image data area.

24. A storage medium storing a plurality of images and a feature of each of the plurality of images in a computer-readable form, comprising:

an attribute information area formed in an image file and storing attribute information necessary to read out and display an image;

a feature data area formed in said image file and continuously storing features of the plurality of images; and an image data area formed in said image file and continuously storing image data of the plurality of images in the image data area.

* * * * *

UNITED STATES PATENT AND TRADEMARK OFFICE
CERTIFICATE OF CORRECTION

PATENT NO.     : 6,813,394 B1
DATED          : November 2, 2004
INVENTOR(S)    : Kentaro Matsumoto et al.

It is certified that error appears in the above-identified patent and that said Letters Patent is hereby corrected as shown below:

Column 4,
Line 4, "the. first" should read -- the first --.

Column 6,
Line 54, "Instep" should read -- In step --.

Column 8,
Lines 35 and 42, "Instep" should read -- In step --;
Lines 39 and 49, "instep" should read -- in step --; and
Line 62, "instep" should read -- in instep --.

Column 9,
Line 57, "instep" should read -- in step --.

Column 11,
Line 13, "YYYYYYYYUUUUUUVVVVV" should read
-- YYYYYYYYUUUUUUUVVVVVVV --.

Column 12,
Line 37, "(PonterToSizeoFS)" should read -- (PointerToSizeOFS) --.

Column 13,
Lines 8 and 23, "Instep" should read -- In step --.

Column 17,
Line 4, "psize" should read -- pSize --.

UNITED STATES PATENT AND TRADEMARK OFFICE
CERTIFICATE OF CORRECTION

PATENT NO. : 6,813,394 B1
DATED : November 2, 2004
INVENTOR(S) : Kentaro Matsumoto et al.

It is certified that error appears in the above-identified patent and that said Letters Patent is hereby corrected as shown below:

<u>Column 22,</u>
Line 48, "area,." should read -- area, --.

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,813,394 B1
DATED : November 2, 2004
INVENTOR(S) : Kentaro Matsumoto et al.

It is certified that error appears in the above-identified patent and that said Letters Patent is hereby corrected as shown below:

Title page,
Item [56], References Cited, OTHER PUBLICATIONS,
"Liaw, W.M., *Reading GIF Files*, Dobb's Journal, vol. 2, No. 2, pp. 56, 58, 60, 103, and 106-107 (1995)" should read -- Liaw, W.M., *Reading GIF Files*, Dr. Dobb's Journal, vol. 2, No. 2, pp. 56, 58, 60, 103, and 106-107 (1995) --.

Signed and Sealed this

Eighth Day of November, 2005

JON W. DUDAS
*Director of the United States Patent and Trademark Office*